(12) United States Patent
Lee

(10) Patent No.: US 11,215,787 B2
(45) Date of Patent: Jan. 4, 2022

(54) CAMERA DEVICE INCLUDING APERTURE AND ELECTRONIC DEVICE INCLUDING THE SAME

(71) Applicant: Samsung Electronics Co., Ltd., Gyeonggi-do (KR)

(72) Inventor: Kyung Bae Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 16/743,260

(22) Filed: Jan. 15, 2020

(65) Prior Publication Data

US 2020/0150380 A1 May 14, 2020

Related U.S. Application Data

(63) Continuation of application No. 15/831,741, filed on Dec. 5, 2017, now Pat. No. 10,571,648.

(30) Foreign Application Priority Data

Dec. 8, 2016 (KR) .................. 10-2016-0166856

(51) Int. Cl.
| | |
|---|---|
| *G02B 7/09* | (2021.01) |
| *G03B 7/095* | (2021.01) |
| *G02B 13/00* | (2006.01) |
| *G03B 9/06* | (2021.01) |
| *G03B 5/02* | (2021.01) |

(Continued)

(52) U.S. Cl.
CPC ............ *G02B 7/09* (2013.01); *G02B 13/001* (2013.01); *G03B 5/02* (2013.01); *G03B 7/095* (2013.01); *G03B 9/06* (2013.01); *H04N 5/2254* (2013.01); *G03B 3/10* (2013.01); *G03B 2205/0015* (2013.01); *G03B 2205/0069* (2013.01)

(58) Field of Classification Search
CPC ............................. G02B 7/09; G02B 13/001
See application file for complete search history.

(56) References Cited

U.S. PATENT DOCUMENTS

| | | | |
|---|---|---|---|
| 7,213,983 B2 | 5/2007 | Nakano | |
| 8,040,584 B2 | 10/2011 | Okita | |

(Continued)

FOREIGN PATENT DOCUMENTS

| | | |
|---|---|---|
| CN | 1846167 A | 10/2006 |
| CN | 101990755 A | 3/2011 |

(Continued)

OTHER PUBLICATIONS

Chinese Search Report dated Dec. 2, 2020.
European Search Report dated May 12, 2020.

*Primary Examiner* — Joseph P Martinez
(74) *Attorney, Agent, or Firm* — Cha & Reiter, LLC

(57) ABSTRACT

Disclosed are a camera device including a lens barrel including at least one lens and a lens hole, a variable aperture defining an aperture hole area arranged on the lens hole, where a size of the aperture hole area is adjustable via a physical force applied to a lever, a first movable carrier in which the lens barrel is seated, to which the variable aperture is fixed, and including at least one magnet member is configured to cooperate with at least one coil to move the first movable carrier, and an aperture driving module configured to adjust the size of the aperture hole area by supplying the physical force to the lever.

14 Claims, 34 Drawing Sheets

(51) Int. Cl.
*H04N 5/225* (2006.01)
*G03B 3/10* (2021.01)

(56) References Cited

U.S. PATENT DOCUMENTS

| | | |
|---|---|---|
| 8,472,800 B2 | 6/2013 | Lee et al. |
| 8,681,227 B2 | 3/2014 | Ryu et al. |
| 8,783,977 B2 | 7/2014 | Kozu et al. |
| 8,982,221 B2 | 3/2015 | Ryu et al. |
| 9,075,285 B2 | 7/2015 | Ryu et al. |
| 9,477,137 B2 | 10/2016 | Yamamoto et al. |
| 2006/0159446 A1 | 7/2006 | Nakano |
| 2011/0032592 A1 | 2/2011 | Okita |
| 2011/0293261 A1 | 12/2011 | Lee et al. |
| 2013/0343738 A1 | 12/2013 | Ryu et al. |
| 2014/0119719 A1 | 5/2014 | Kozu et al. |
| 2015/0062706 A1 | 3/2015 | Lim et al. |
| 2016/0274441 A1* | 9/2016 | Yamamoto ............... G03B 9/00 |

FOREIGN PATENT DOCUMENTS

| | | |
|---|---|---|
| CN | 104423012 A | 3/2015 |
| CN | 105988263 A | 10/2016 |
| KR | 10-2011-0130828 A | 12/2011 |
| KR | 10-1272790 B1 | 6/2013 |
| KR | 10-2016-0020768 A | 2/2016 |
| WO | 2011/002151 A2 | 1/2011 |

\* cited by examiner

CAMERA DEVICE INCLUDING APERTURE AND ELECTRONIC DEVICE INCLUDING THE SAME

CROSS-REFERENCE TO RELATED APPLICATIONS

This application is a Continuation of U.S. patent application Ser. No. 15/831,741 filed on Dec. 5, 2017 which claims the benefit under 35 U.S.C. § 119(a) of a Korean patent application filed on Dec. 8, 2016 in the Korean Intellectual Property Office and assigned Serial number 10-2016-0166856, the entire disclosure of which is hereby incorporated by reference.

TECHNICAL FIELD

The present disclosure generally relates to a camera device of an electronic device.

BACKGROUND

In recent years, various portable electronic devices, such as smartphones and tablet PCs, have been increasingly popular. These portable electronic devices may include photographing capabilities. As, these portable electronic devices may include cameras.

SUMMARY

The conventional portable electronic device may be designed to have limited size and thickness so that they are portable. Correspondingly, it is often advantageous for the camera device included in the portable electronic device to be of a relatively small size. To minimize the size of the camera device, it may be manufactured without certain components, such as the physical aperture. Because it is difficult to adjust the amount of light entering the camera device without an aperture, the capabilities of the conventional camera device may be limited.

Various embodiments of the present disclosure provide a camera device that includes a variable aperture, which may be adjusted depending on the specified function of the camera device, and an electronic device including the same.

As described above, various embodiments may provide a camera device that may support variable aperture where dimensions of the camera device may be minimized, and an electronic device including the same.

In accordance with an aspect of the present disclosure, a camera device is provided. The camera device may include a lens barrel including at least one lens and a lens hole; a variable aperture defining an aperture hole area arranged on the lens hole, where a size of the aperture hole area is adjustable via a physical force applied to a lever; a first movable carrier in which the lens barrel is seated, to which the variable aperture is fixed, and including at least one magnet member is configured to cooperate with at least one coil to move the first movable carrier; and an aperture driving module configured to adjust the size of the aperture hole area by supplying the physical force to the lever.

In accordance with another aspect of the present disclosure, an electronic device is provided. The electronic device may include a case; a camera device, at least a portion of which is exposed through a hole formed in the case; and a processor electrically connected to the camera device, where the camera device includes: a lens barrel including at least one lens and a lens hole; a variable aperture defining an aperture hole area arranged on the lens hole, wherein a size of the aperture hole area is adjustable via a physical force applied to a lever; a first movable carrier in which the lens barrel is seated, to which the variable aperture is fixed, and including at least one magnet member is configured to cooperate with at least one coil to move the first movable carrier; and an aperture driving module configured to adjust the size of the aperture hole area by supplying the physical force to the lever.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
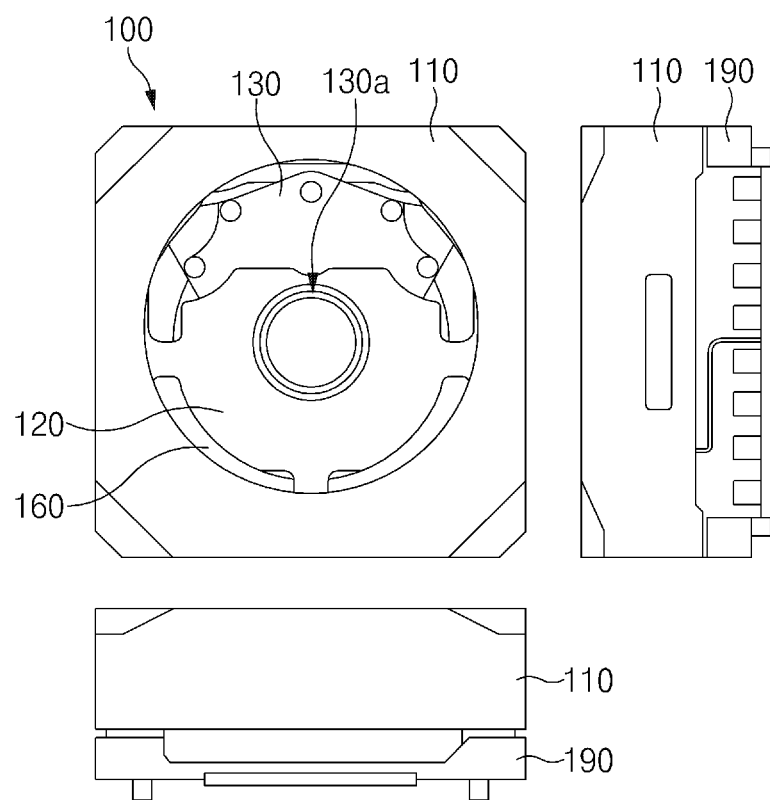
FIG. 1A is top and side views illustrating a camera module according to an embodiment of the present disclosure.

Various embodiments of the present disclosure may be described with reference to accompanying drawings. Accordingly, those of ordinary skill in the art will recognize that modifications, equivalents, and/or alternatives of the various embodiments described herein can be made without departing from the scope and spirit of the present disclosure.

In the disclosure disclosed herein, the expressions "have," "may have," "include," "comprise," "may include," and "may comprise" indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments, but do not limit the elements. Furthermore, such terms may be used to distinguish one element from another element. For example, "a first user device" and "a second user device" may indicate different user devices regardless of the order or priority thereof. In another example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., the third element).

The expression "configured to" used herein may mean "suitable for," "having the capacity to," "designed to," "adapted to," "made to," or "capable of." As such, the term "configured to" does not necessarily mean only "specifically designed to" in hardware. Instead, the expression "a device configured to" may mean that the device is "capable of" operating together with another device or other components. A "processor configured to perform A, B, and C," for example, may mean a dedicated processor (e.g., an embedded processor) for performing the specified operation or a generic-purpose processor (e.g., a central processing unit (CPU) or an application processor) which may perform the specified operation by executing one or more software programs which are stored in a memory device.

Terms used in the present disclosure are used to describe specified embodiments and are not intended to limit the scope of the present disclosure. The terms in singular form may also refer to the plural, unless otherwise specified. Unless otherwise defined herein, all the terms used herein, which include technical and scientific terms, may have the same meaning that is generally understood by a person skilled in the art. It will be further understood that terms, which are defined in dictionaries and commonly used, should also be interpreted according to their customary meaning in the relevant related art and not according to other meanings unless expressly so defined herein. In some cases, even if a term is explicitly defined in the specification, it may not be interpreted to exclude embodiments of the present disclosure.

Electronic devices according to various embodiments of the present disclosure may be smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart watches, and the like.

According to another embodiment, the electronic devices may be home appliances, such as televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™, electronic dictionaries, electronic keys, camcorders, electronic picture frames, or the like.

According to another embodiment, the electronic devices may be medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, medical scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales devices (POSs), or IoT (Internet of Things) devices (e.g., light bulbs, sensors, electric or gas meters, sprinkler devices, fire alarms, thermostats, street lamps, toasters, exercise equipment, hot water tanks, heaters, boilers, and the like).

According to another embodiment, the electronic devices may be parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described devices or a combination thereof. An electronic device according to an embodiment may be a flexible device. Furthermore, an electronic device according to an embodiment may not be limited to the above-described electronic devices and may include other electronic devices developed in the art.

Hereinafter, electronic devices according to the various embodiments may be described with reference to the accompanying drawings. The term "user" used herein may refer to a person who uses the electronic device or may refer to a device (e.g., an artificial intelligence electronic device) that uses the electronic device.

Figure 1B:
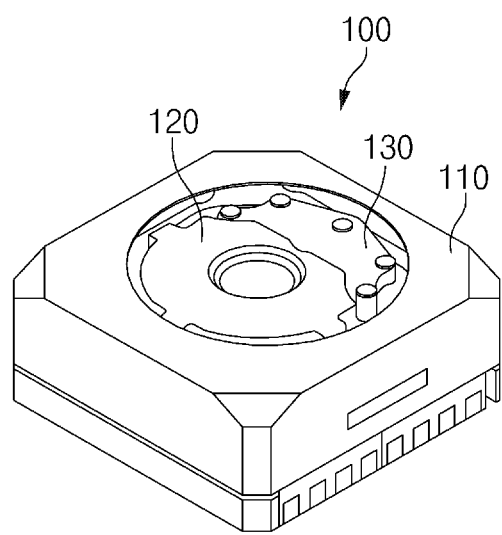
FIG. 1B is a perspective view illustrating a camera module according to an embodiment of the present disclosure.
Figure 1C:
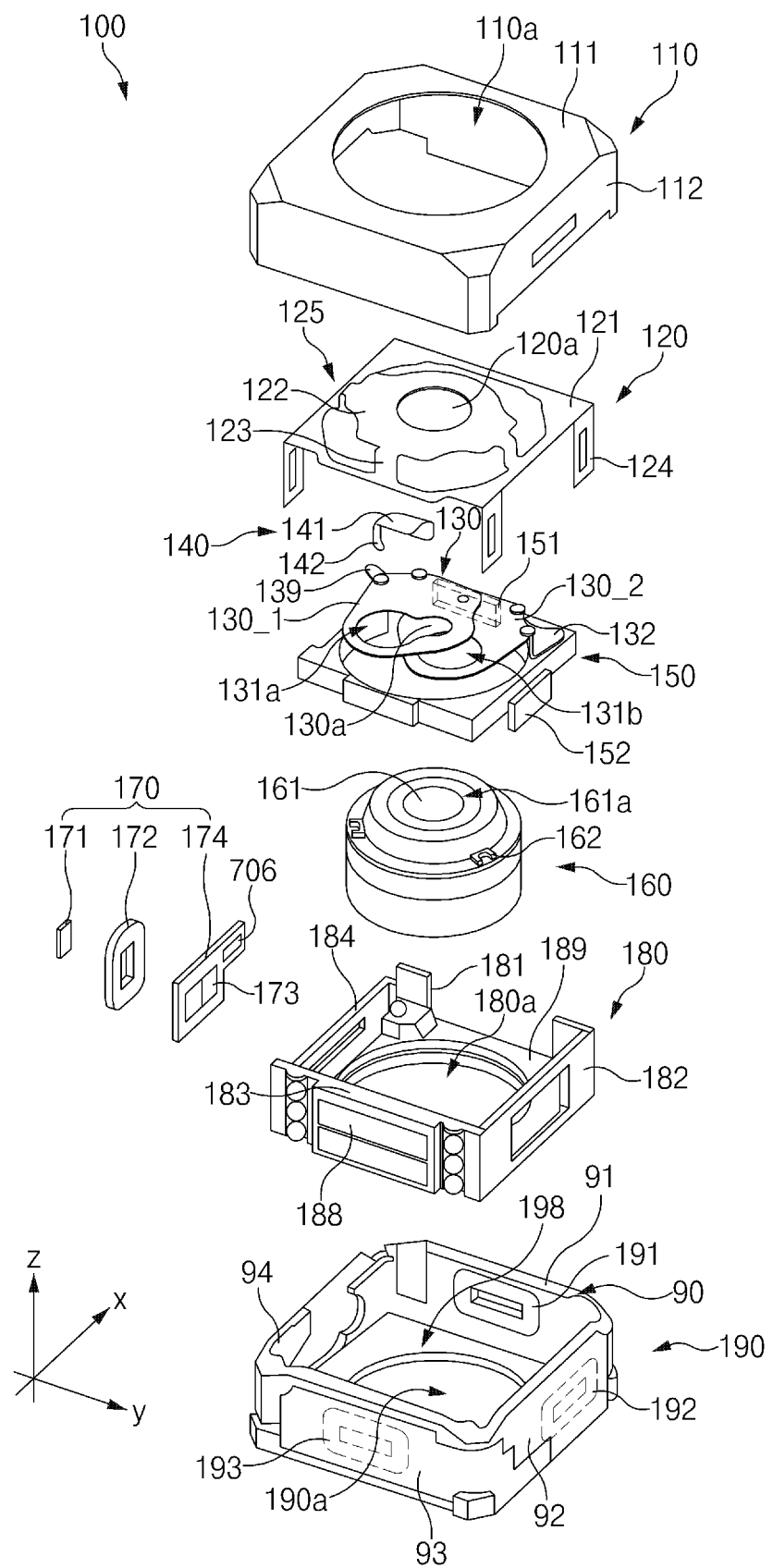
FIG. 1C is an exploded view illustrating a camera module according to an embodiment of the present disclosure.

FIG. 1A is top and side views of a camera module (or camera device) according to an embodiment of the present disclosure. FIG. 1B is a perspective view of a camera module according to an embodiment of the present disclosure. FIG. 1C is an exploded perspective view of a camera module according to an embodiment of the present disclosure.

Referring to FIGS. 1A to 1C, the camera module 100 according to the embodiment of the present disclosure may include a shield can 110, a stopper 120, a variable aperture 130, an aperture fixing unit 140, a first movable carrier 150, a lens barrel 160, a second movable carrier 180, an aperture driving module 170, and a housing 190. In the above-described camera module 100, the variable aperture 130 may be disposed on the lens barrel 160, and the size of an aperture hole area 130a of the variable aperture 130 may be adjusted by the aperture driving module 170. For example, the camera module 100 may change the size of the variable aperture 130 depending on, for example, the currently-set photographing mode. According to an embodiment, the camera module 100 may be adjusted such that the size of the aperture hole area 130a is a first size (e.g., the maximum size) when a first photographing function (e.g., pan-focusing) is executed. Similarly, the camera module 100 may be adjusted such that the size of the aperture hole area 130a is a second size (e.g., the minimum size) when a second photographing function (e.g., zoom-focusing function or zoom-focusing function) is executed. Further, the size of the aperture hole area 130a may be adjusted to be between the maximum value and the minimum value.

The above-described camera module 100 according to the present disclosure may have a state in which the variable aperture 130 is disposed in the first movable carrier 150. The first movable carrier 150 in turn is coupled to the lens barrel 160 and is disposed on the lens barrel 160. Accordingly, the variable aperture 130 may be moved in the X-axis or Y-axis direction in correspondence to the movement of the lens barrel 160. Further, the camera module 100 may include a second movable carrier configured to move the first movable carrier 150 in the Z-axis direction. The above-described camera module 100 may minimize the height (i.e. length in the z-axis direction) of the camera module 100 by minimizing a gap between an uppermost end of the lens barrel 160 and the aperture hole area 130a of the variable aperture 130 (e.g., there may be no gap, such that part of the uppermost lens of the lens barrel 160 protrudes through the aperture hole area 130a).

The shield can 110 may cover the camera module 100 from its upper surface to lower surface as a whole. For example, the shield can 110 may include an upper surface 111 and shield can side walls 112 disposed at the peripheries of the upper surface 111. The bottom of the shield can 110 may be open. The upper surface 111 of the shield can 110 may include a shield can hole 110a of a specific size such that at least a portion of the lens 161 disposed at a central portion of the lens barrel 160 may be exposed. The shield can side walls 112 may be coupled to the peripheries of the housing 190 so that the shield can 110 and the housing 190 enclose and protect the internal components (e.g., the stopper 120, the variable aperture 130, the aperture fixing unit 140, the first movable carrier 150, the lens barrel 160, the second movable carrier 180, and the aperture driving module 170) of the camera module 100. The shield can 110, for example, may be made of metal or another material (e.g., reinforced plastic) having a specified hardness value.

The stopper 120 may be disposed between the shield can 110 and the variable aperture 130 to prevent the variable aperture 130 from deviating in the positive-Z direction (e.g., the upward direction). The stopper 120 may include an upper substrate 125 and leads 124. The upper substrate 125 may include a peripheral area 121 having a polygonal band (e.g., rectangular band) shape, a hollow central portion, and a stopper substrate 122 including a stopper hole 120a at the central portion thereof and having a specific size such that the aperture hole area 130a of the variable aperture 130 may be exposed. The stopper substrate 122 may be connected and fixed to one side of the peripheral area 121 through connecting portions 123. The structure of the stopper 120 may be integrally formed. For example, the upper substrate 125 (the peripheral area 121 and the stopper substrate 122), the connecting portion 123, and the leads 124 may be machined from a single piece of metal.

The stopper substrate 122 may be disposed at the uppermost surface of the stopper 120, and may be spaced apart from the peripheral area 121 by a specific height (e.g., the height of the connecting portion 123). In other words, the stopper substrate 122 is spaced apart from the variable aperture 130 by a specific interval due to the height of the connecting portion 123, such that it allows for upward movement by the variable aperture 130. The leads 124 may be formed on sides (e.g., corners) of the peripheral area 121. According to an embodiment, the leads 124 may have a band shape, such that the central portion of the leads are hollow. The leads 124 may be coupled to the sides of the first movable carrier 150 and/or the second movable carrier 180.

The variable aperture 130 may include two wing parts 130_1 and 130_2. The wing parts 130_1 and 130_2 may partially overlap each other. The overlapping wing parts 130_1 and 130_2 may be rotatably fixed so that they can rotate within a specific angle range. Each of the wing parts 130_1 and 130_2 may include wing holes 131a and 131b having different sizes at the respective central portion thereof. Depending on the rotational states of the wing parts 130_1 and 130_2 in relation to each other, the wing holes 131a and 131b may partially overlap each other. The wing holes 131a and 131b partially overlap each other to form the central aperture hole area 130a. The wing holes 131a and 131b may have irregular shapes where different portions of the shapes have different sizes, so that depending on where the wing holes 131a and 131b overlap, different-sized central aperture hole may be produced. For example, as shown in FIG. 1C, the wing hole 131a may have a snowman or figure-8 shape. According to other embodiments, the wing holes 131a and 131b may include a plurality of holes that are spaced apart from each other by a specific interval (e.g., two holes of different diameters that are spaced apart from each other).

The wing parts 130_1 and 130_2 may be engaged to be moved so that the wing holes 131a and 131b can variously overlap. For example, when the wing parts 130_1 and 130_2 are moved to be closer to each other, such that the overlapping area of the wing parts 130_1 and 130_2 increases, the aperture hole area 130a may become larger. Conversely, when the wing parts 130_1 and 130_2 are moved to be further apart, such that the overlapping area of the wing parts 130_1 and 130_2 decreases, the aperture hole area 130a may become smaller. The above-described wing parts 130_1 and 130_2 are seated on one side of the first movable carrier 150.

The aperture fixing unit 140 may be disposed on a periphery of one side of the variable aperture 130 so that it can cause the rotation of the variable aperture 130. For example, the aperture fixing unit 140 may be disposed on one side of the variable aperture 130 and include a lever 139 that can be used to rotate the wing part 130_1. At the same time, a wing holder 132 disposed on the other side of the variable aperture 130 fixes the wing part 130_2 in place. The aperture fixing unit 140 may include a cover 141 disposed to cover an upper surface of a corner area of the variable aperture 130, where the cover may prevent deviation of the variable aperture 130 in the Z-axis direction. The aperture fixing unit 140 may further include a side lead 142 disposed to overlap a side of the corner area of the variable aperture 130. The side lead 142 may be used to move the lever 139 within a specific angle while preventing deviation of the variable aperture 130 in the X-axis direction or Y-axis direction.

The first movable carrier 150 may be configured such that the inner center of the first movable carrier 150 is hollow so as to accommodate at least a portion of the lens barrel 160. The variable aperture 130 may be seated on and fixed to one side of an upper portion of the first movable carrier 150. Then, the first movable carrier 150 may be coupled to the lens barrel 160. A first magnet member 151 and a second magnet member 152 may be disposed on at least two outer sides of the first movable carrier 150. The two outer sides may be adjacent to each other. The first and second magnet members 151 and 152 may be used to compensate for shakiness of the camera module 100 when it is in use. In doing so, the first magnet member 151 and the second magnet member 152 may pair with hand-shaking compensation related coils 191 and 192 disposed on two sides of the housing 190, such that the first movable carrier 150 may move in the X-axis or Y-axis direction within the housing 190.

The interior of the lens barrel 160 has a can shape, and one or more lenses are disposed in the interior of the lens barrel 160. The lenses are spaced apart from each other by specific intervals in the Z-direction. According to an embodiment, the upper portion of the lens barrel 160 may taper. A lens hole 161a may be disposed at an upper end of the lens barrel 160. At least a portion of the uppermost lens 161 may be exposed through the lens hole 161a. According to an embodiment, the uppermost lens 161 may be convex, such that a portion of the uppermost lens 161 extends beyond the upper surface of the lens barrel 160. A fixing recess or a fixing boss 162, to which the first movable carrier 150 or the stopper 120 is fixed, may be disposed on one side of the lens barrel 160.

A through-hole 180a of a specific size may be provided at a central portion of the second movable carrier 180, and the second movable carrier 180 may include a frame 189 that forms the through-hole 180a, and one or more carrier side walls 181, 182, 183, and 184 extending upwards from peripheries of the frame 189. For example, the carrier side walls 181, 182, 183, and 184 may include a first carrier side wall 181, a second carrier side wall 182, a third carrier side wall 183, and a fourth carrier side wall 184. The first carrier side wall 181 may include a recess or hole such that the first magnet member 151 disposed on one side of the first movable carrier 150 is exposed. The second carrier side wall 182 may include a specific recess or hole such that at least a portion of the second magnet member 152 disposed on another side of the first movable carrier 150 is exposed. As described above, the first magnet member 151 and the second magnet member 152 may be coupled to the coils 191 and 192 to move the lens barrel 160 in the X-axis and/or Y-axis direction. The third carrier side wall 183 may include a third magnetic member 188 that cooperates with a coil 193 in the housing 190 to move the lens barrel 160 in the Z-axis direction. A least some components of the aperture driving module 170 for the adjustments of the wing parts 130_1 and 130_2 of the variable aperture 130 may be disposed in the fourth carrier side wall 184. A portion of the lens barrel 160, such the lower end of the lens barrel 160, may be seated inside the above-described second movable carrier 180.

The aperture driving module 170, for example, may be disposed on one side of the variable aperture 130, and may be coupled to the lever 139. The aperture driving module 170 may include a support 174 configured to move the lever 139 in a specific direction (e.g., in one direction on a horizontal plane, for example, in the X-axis direction), a fourth magnet member 173 disposed on one side of the support 174, an aperture coil 172 configured to move the fourth magnet member 173 in the specific direction when electric power is supplied, and an aperture driving IC 171 configured to control supply of electric power to the aperture coil 172. The fourth magnet member may be called an aperture driving magnet member. The aperture driving IC 171 and the aperture coil 172, for example, may be disposed on one side of the housing 190. Further, the support 174, in which the fourth magnet member 173 is disposed, may be disposed on one side (e.g., the fourth carrier side wall 184) of the second movable carrier 180.

The support 174 may include a holding hole 706, into which the lever 139 may be inserted. The holding hole 706 may have an elongated shape extending in one direction, along which the lever 139 may be moved in the direction (e.g., the X-axis direction). Further, the holding hole 706 may further include a guard area so that the support 174 does not interfere with the lever 139 while the lens barrel 160 is moving to compensate for shakiness of the camera module 100. For example, including the guard area, the surface area of holding hole 706 may be bigger than the cross-sectional area of the lever 139. The size of guard area may correspond to the distance by which the lens barrel 160 is moved during the compensation for shakiness of the camera module 100 in both the +X-axis and −X-axis directions. For example, guard areas may be provided on the upper and lower sides of the holding hole 706.

The housing 190 may include a seating part 198, in which the above-described components (e.g., the stopper 120, the variable aperture 130, the aperture fixing unit 140, the first movable carrier 150, the lens barrel 160, and the second movable carrier 180) are disposed, and housing side walls 90 surrounding the above-described components. The seating part 198 may include a seating part hole 190a, through which a central portion of the lens barrel 160 is exposed downwards. An image sensor, for example, may be disposed under the seating part hole 190a.

The housing side walls 90 may be provided at peripheries of the seating part 198. The housing side walls 90, for example, may include a first housing side wall 91 having the first coil 191. As described above, the first coil 191 cooperates with the first magnet member 151 disposed in the first movable carrier 150 to move the lens barrel 160 in the X-axis direction. The housing side walls 90 further includes a second housing side wall 92 having the second coil 192. As described above, the second coil 192 cooperates with the second magnet member 152 disposed in the first movable carrier 150 to move the lens barrel 160 in the Y-axis direction. The housing side walls 90 further includes a third housing side wall 93 having a third coil 193 that cooperates with the third magnet member 188 disposed in the second movable carrier 180 to move the lens barrel 160 in the Z-axis direction. And the housing side walls 90 may further include a fourth housing wall 94 in which the aperture coil 172 is disposed. At least some of the housing side walls 90 may protect the at least some of the components described above in conjunction with the shield can side walls 112.

The above-described camera module 100 according to the present disclosure may have a variable aperture 130. The variable aperture 130 may be disposed on the first movable carrier 150 so that it is moved together as the lens barrel 160 is moved. Accordingly, the spatial relationship between the lens barrel 160 and the variable aperture 130 may be maintained regardless of the movement of the lens barrel 160 (e.g., movement in the X-axis/Y-axis direction to compensate for shakiness or movement in the Z-axis direction for auto-focusing). Further, the camera module 100 according to the present disclosure may minimize the vertical thickness of the camera module 100 by aligning the aperture hole area 130a of the variable aperture 130 with the uppermost lens 161 disposed inside the lens barrel 160 and extending at least a portion of the uppermost lens 161 through the aperture hole area 130a. Further, in relation to driving of the variable aperture 130, the camera module 100 according to the present disclosure may include a guard area in the holding hole 706, in which the lever 139 is disposed, so that the support 174 does not interfere with the lever 139 during when the lens barrel 160 is moving to compensate for shakiness.

Figure 2A:
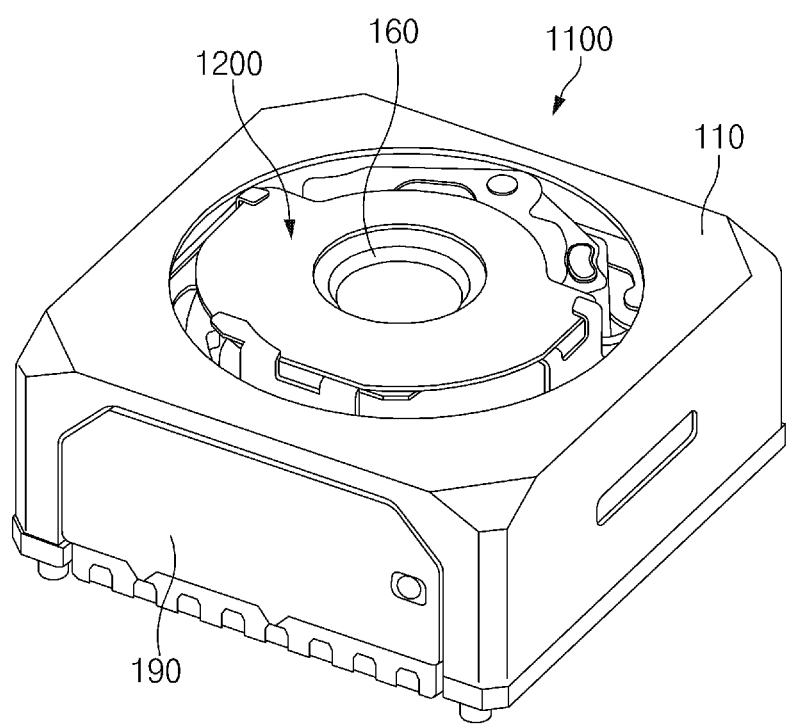
FIG. 2A is a perspective view illustrating a camera module according to another embodiment of the present disclosure.
Figure 2B:
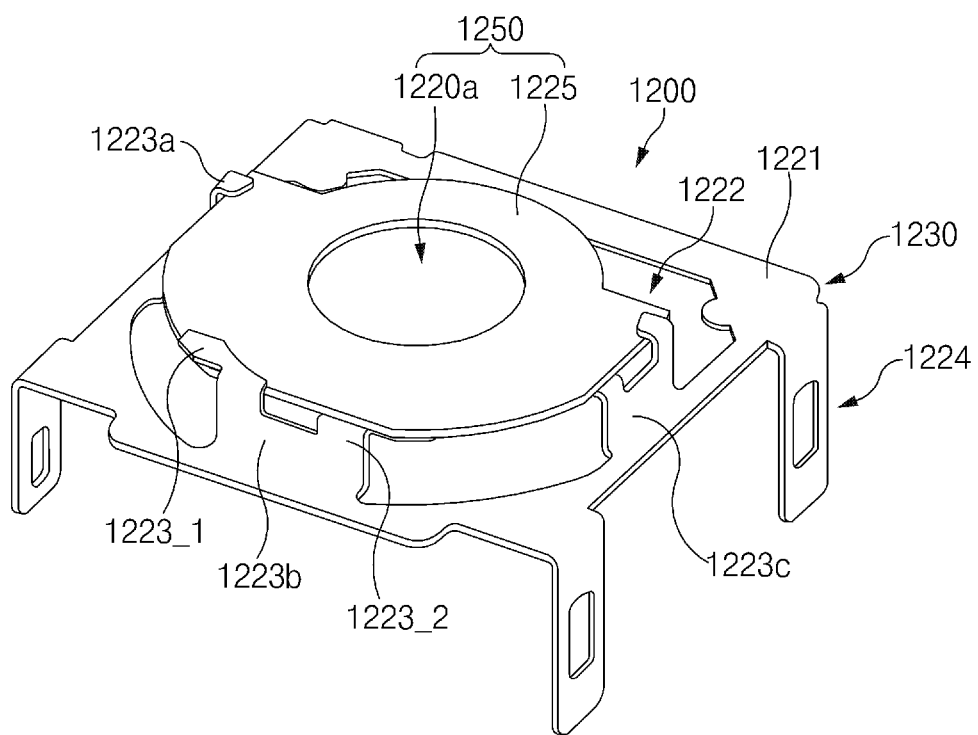
FIG. 2B is a perspective view illustrating a stopper according to an embodiment of the present disclosure.

FIG. 2A is a perspective view illustrating a camera module according to another embodiment of the present disclosure. FIG. 2B is a perspective view illustrating a stopper according to another embodiment of the present disclosure.

Referring to FIGS. 2A and 2B, the camera module 1100 of another embodiment of the present disclosure may include a shield can 110, a modified stopper 1200, a variable aperture 130, a lens barrel 160, and a housing 190. Additionally, the camera module 1100 may further include a first movable carrier, on which the lens barrel 160 is mounted, a second movable carrier, on which the first movable carrier is seated, and an aperture driving module configured to adjust the size of an aperture hole of the variable aperture 130. The shield can 110 in this embodiment may have a shape that is substantially same as or similar to the shape of the shield can described above in FIGS. 1A to 1C. Further, the variable aperture 130, the lens barrel 160, and the housing 190 also may be the same as or similar to those described above in FIGS. 1A to 1C.

Similar to the function of the stopper 120, the modified stopper 1200 may be disposed between the shield can 110 and the variable aperture 130 to prevent the variable aperture 130 from deviating in the Z-axis direction (e.g., the upward direction). In this regard, the modified stopper 1200 may include a stopper substrate 1250, connecting portions 1223a, 1223b, and 1223c, an upper substrate 1230, and leads 1224.

The upper substrate 1230 may include a peripheral area 1221 having a polygonal band shape (e.g., rectangular), and a hollow central through part 1222.

The connecting portions 1223a, 1223b, and 1223c may have specific vertical heights and may be disposed at peripheries of the through part 1222. The connecting portions 1223a, 1223b, and 1223c may be provided to support the stopper substrate 1250 so that the stopper substrate 1250 is separated from the upper substrate 1230 in the Z-axis direction by the specific height. According to an embodiment, at least one of the connecting portions 1223a, 1223b, and 1223c may include a first lead 1223_1 contacting the upper surface of the stopper substrate 1250, and a second lead 1223_2 contacting the lower surface of the stopper substrate 1250. Accordingly, one side of the stopper substrate 1250 may be inserted and seated between the first lead 1223_1 and the second lead 1223_2, and the stopper substrate 1250 may be fixed by the connecting portions 1223a, 1223b, and 1223c.

The stopper substrate 1250 may include a substrate area 1225, the peripheries of which are coupled to the connecting portions 1223a, 1223b, and 1223c, and a stopper hole 1220a provided at a central portion of the stopper substrate 1250. The stopper hole 1220a may have a specific size such that the aperture hole area 130a of the variable aperture 130 can be exposed through the stopper hole 1220a.

As shown in FIG. 2B, the stopper substrate 1250 may be inserted or removed from the connecting portions 1223a, 1223b, and 1223c from the side of the peripheral area 1221 that does not have a connecting portion. The connecting portions 1223a, 1223b, and 1223c may be integrally formed with the peripheral area 1221.

The above-mentioned modified stopper 1200 may allow the stopper substrate 1250 to be assembled after the variable aperture 130 is assembled in the first movable carrier, because the stopper substrate 1250 and the upper substrate 1230 are separate pieces. This may be helpful in the manufacturing process for the camera module 100.

Figure 3:
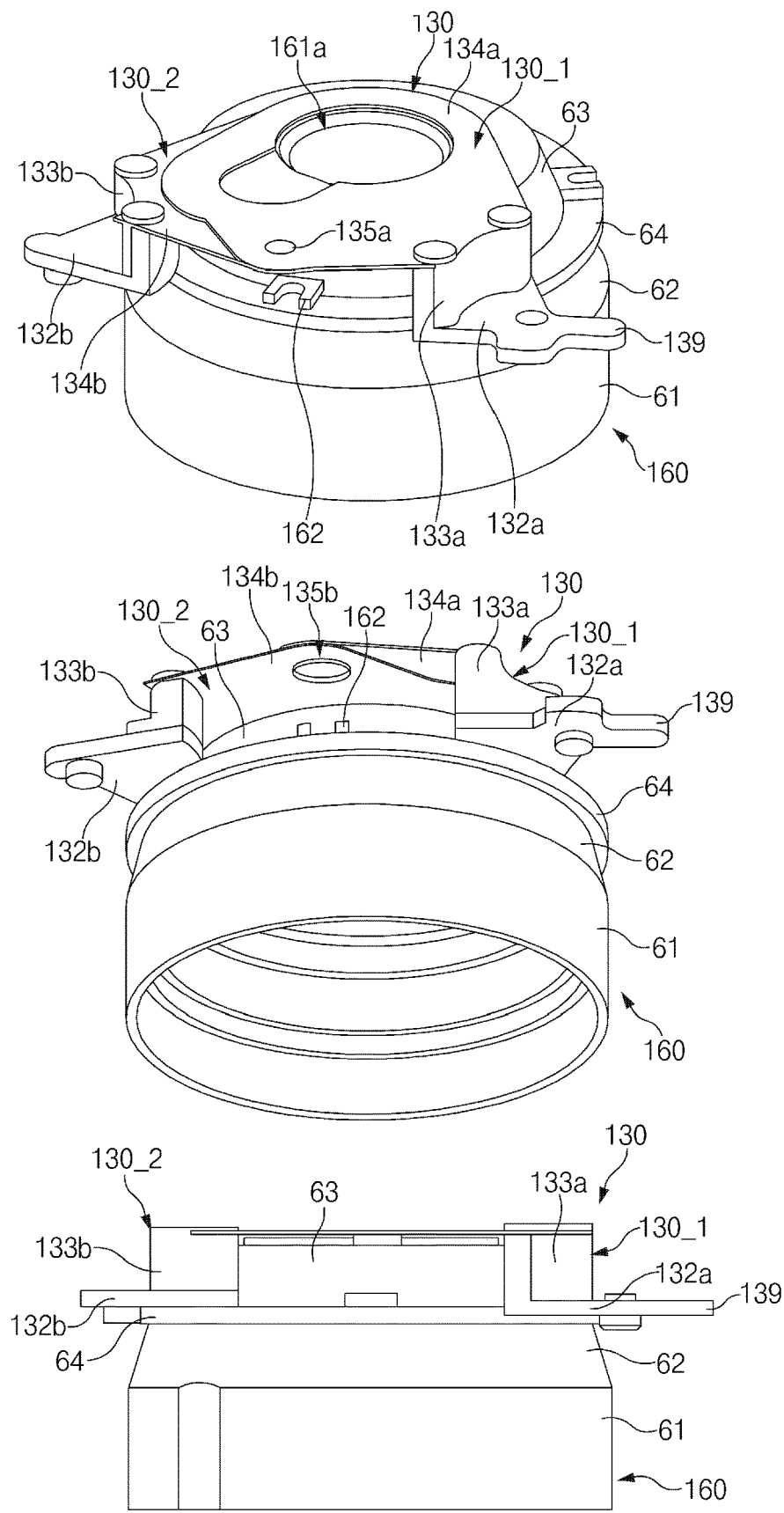
FIG. 3 is views illustrating a variable aperture and a lens barrel according to an embodiment of the present disclosure.
Figure 4A:
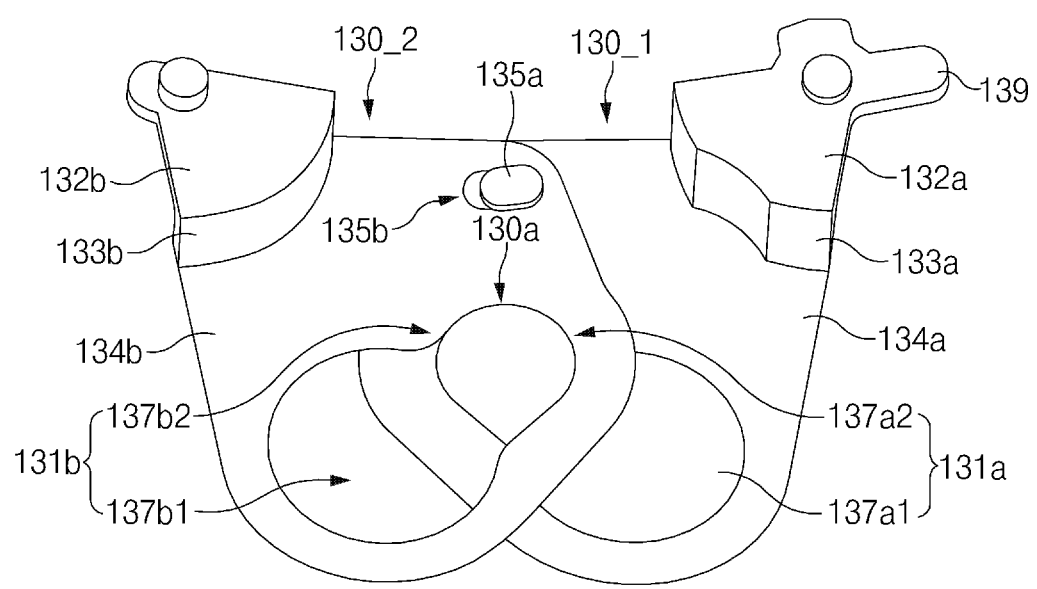
FIG. 4A is a perspective view illustrating a variable aperture according to an embodiment of the present disclosure.
Figure 4B:
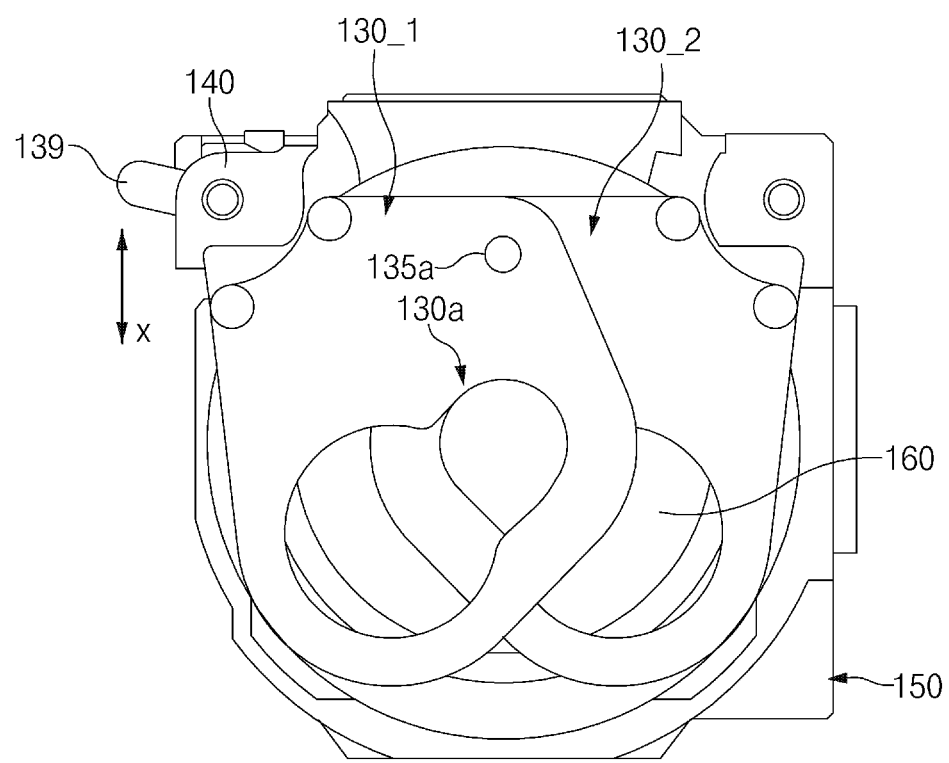
FIG. 4B is a top view illustrating a first movable carrier, on which a variable aperture is mounted, and a lens barrel according to an embodiment of the present disclosure.
Figure 4C:
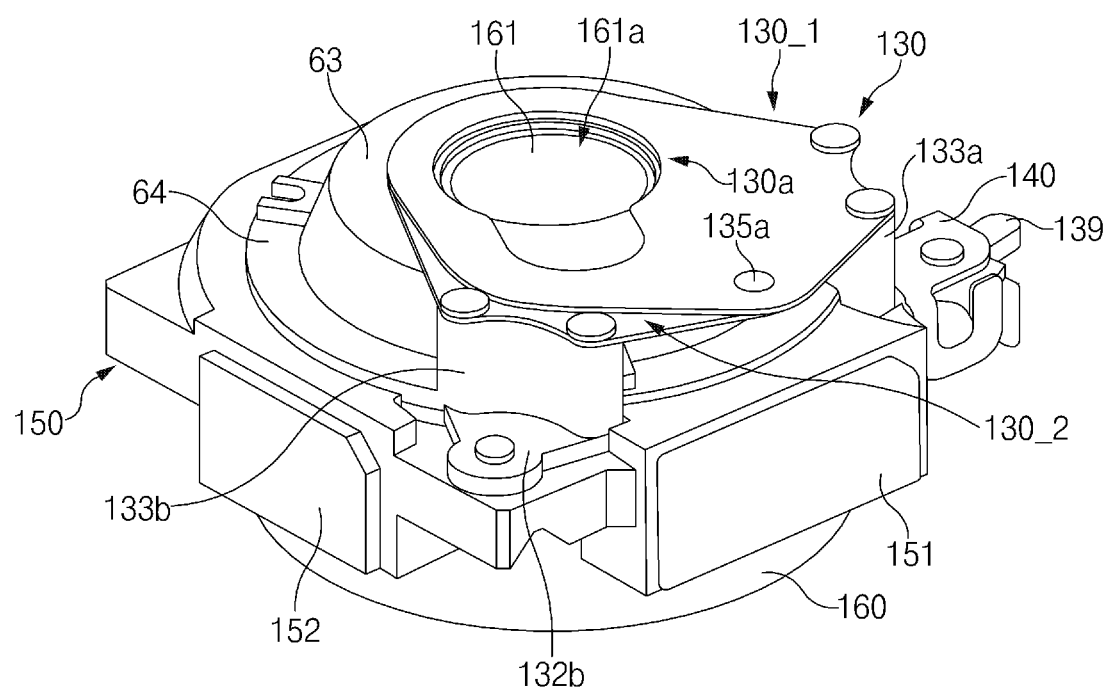
FIG. 4C is a perspective view illustrating a first state of a variable aperture according to an embodiment of the present disclosure.
Figure 4D:
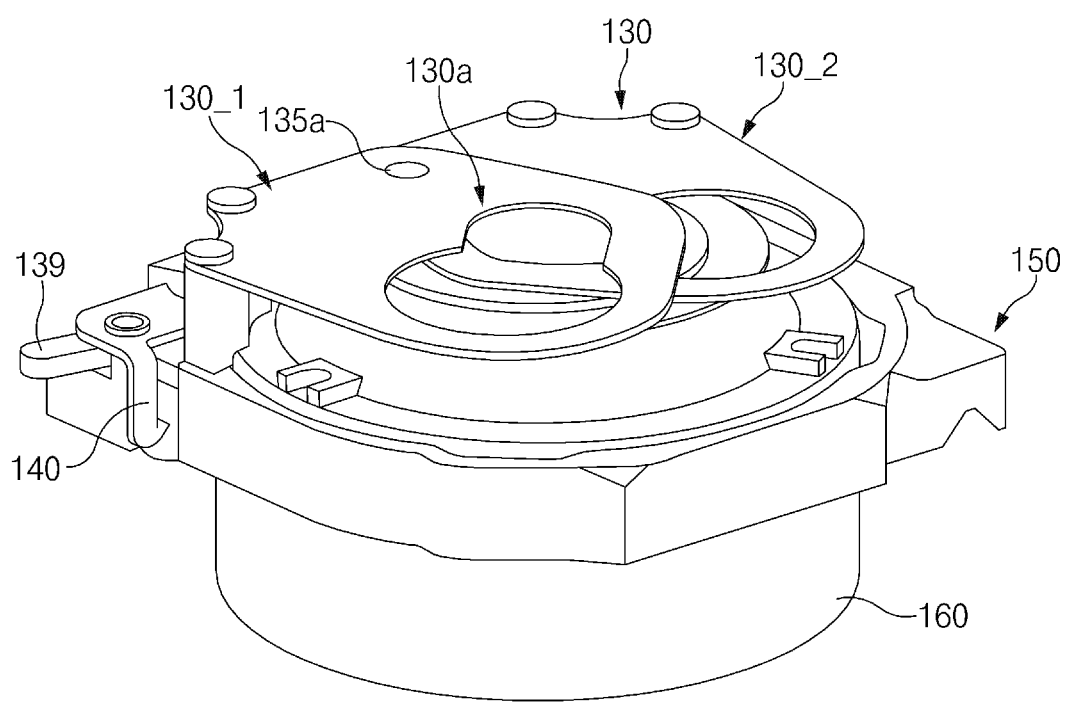
FIG. 4D is a perspective view illustrating a second state of a variable aperture according to an embodiment of the present disclosure.

FIG. 3 is views illustrating a variable aperture and a lens barrel according to an embodiment of the present disclosure. FIG. 4A is a perspective view illustrating a variable aperture according to an embodiment of the present disclosure. FIG. 4B is a top view illustrating a first movable carrier, on which a variable aperture is mounted, and a lens barrel according to an embodiment of the present disclosure. FIG. 4C is a perspective view illustrating a first state of a variable aperture according to an embodiment of the present disclosure. FIG. 4D is a perspective view illustrating a second state of a variable aperture according to an embodiment of the present disclosure.

Referring to FIG. 3, the variable aperture 130 may be disposed on one side of the lens barrel 160. As illustrated, the lens barrel 160 according to an embodiment of the present disclosure may include a lower barrel 61 having a cylindrical shape of a first diameter, a middle barrel 62 having a second diameter which gradually tapers, a protrusion 64 having a circular band shape that protrudes from the exterior of the middle barrel 62, and an upper barrel 63 disposed on the protrusion 64 and having a diameter that is smaller than that of the middle barrel 62, where the diameter of the upper barrel 63 also gradually tapers. A lens hole 161a, through which external light is introduced into the lens barrel 160, may be disposed on an upper surface of the upper barrel 63.

Notches may be disposed on an inner wall of the lower barrel 61. The peripheries of lenses may be received by these notches so that the lenses are held in place. Similarly, notches also may be disposed on inner walls of the middle barrel 62 and the upper barrel 63.

Fixing bosses 162 each having a recess of a specific size may be disposed on one side of an upper surface of the protrusion 64. The fixing bosses 162, for example, may be used for coupling to the stopper 120. According to an embodiment, sides of the connecting portions 123 provided in the stopper 120 may be seated on the recesses of the fixing bosses 162. According to one embodiments, the variable aperture 130 may be seated on the protrusion 64.

Referring to FIGS. 3 to 4B, and as described above, the variable aperture 130 may include a first wing part 130_1 and a second wing part 130_2. The first wing part 130_1, for example, may include a first wing 134a, a first wing support 133a connected to the first wing 134a, a first wing holder 132a connected to the first wing support 133a, a lever 139, and a connection boss 135a. The second wing part 130_2, for example, may include a second wing 134b, a second wing support 133b connected to the second wing 134b, a second wing holder 132b connected to the second wing support 133b, and a connection hole 135b.

The first wing 134a may have various shapes, such as a polygonal shape. A first upper hole 137a2 and a first lower hole 137a1 may be disposed on the first wing 134a. The diameter of the first upper hole 137a2 and the diameter of the first lower hole 137a1 may be different. According to an embodiment, the diameter of the first upper hole 137a2 may be smaller than the diameter of the first lower hole 137a1. Accordingly, the shape of the first upper hole 137a2 and the first lower hole 137a1 together may resemble a snowman. According to one embodiment, in manufacturing the first wing 134a, the first upper hole 137a2 may be a circular hole of a first size created on the first wing 134a. Then, the first lower hole 137a1, which is another circular hole of a second size (e.g., which is the same as or larger than the first size), may be created on the first wing 134a. The first upper hole 137a2 and the first lower hole 137a1 may be spaced apart from each other. The second upper hole 137b2 and the second lower hole 137b1 may be similarly created on the second wing 134b. When the wing parts 130_1 and 130_2 are rotated to maximally overlap each other, the first lower hole 137a1 and the second lower hole 137b1 may overlap each other. On the other hand, when the wing parts 130_1 and 130_2 are rotated to minimally overlap each other, the first upper hole 137a2 and the second upper hole 137b2 may overlap each other.

As the wing parts 130_1 and 130_2 are moved, the holes 137a1, 137a2, 137b1, and 137b2 may be variously disposed on the center point of the lens hole 161a. For example, in one rotational configuration, the first upper hole 137a2 may be disposed on the lens hole 161a while overlapping the second upper hole 137b2 provided in the second wing 134b.

The first wing support 133a may extend from a periphery of one side of the first wing 134a while having a specific angle (e.g., a vertical angle) with a surface of the first wing 134a. The first wing support 133a has a partially cylindrical shape and may extend toward the lens barrel 160. A lower side of the first wing support 133a may rest on the protrusion 64. As the height of the first wing support 133a may be larger than the height of the upper barrel 63, the first wing 134a may be spaced apart from the front surface of the upper barrel 63 by the height of the first wing support 133a.

The first wing holder 132a is connected to a lower side of the first wing support 133a and may extend outwards. Accordingly, the first wing holder 132a may prevent movement by the first wing part 130_1 in the Z-axis direction when the first wing holder 132a abuts the inner surface of the stopper 120. The first wing holder 132a may be disposed on one side of an upper portion of the first movable carrier 150.

The lever 139 may protrude from one side of the first wing holder 132a. The lever 139 may be moved in specific directions (e.g., in the +X-axis and −X-axis directions) by the aperture driving module 170. The lever 139 may transmit a force that moves the first wing holder 132a, and the first wing 134a connected to the first wing support 133a may be rotated due to the force. The first upper hole 137a2 and/or the first lower hole 137a1 may be positioned on the lens hole 161a in correspondence to the rotation of the first wing 134a.

The connection boss 135a may be disposed on one side of the first wing 134a, and may be disposed in the area where the first wing 134a overlaps the second wing 134b. According to an embodiment, the connection boss 135a may protrude from the first wing 134a, and may be inserted into the connection hole 135b provided on one side of the second wing 134b. The connection boss 135a and the connection hole 135b may allow for rotation of the first wing 134a and the second wing 134b. Accordingly, a rotational force is transmitted to the connection boss 135a while the first wing 134a is rotated, and the second wing 134b may also be rotated in a specific angle range in correspondence to the movement of the connection boss 135a.

The second wing 134b may have a shape that is substantially the same as or similar to that of the first wing 134a, except for the connection hole 135b. For example, the second wing 134b may include a second upper hole 137b2 and a second lower hole 137b1. The second upper hole 137b2 and the second lower hole 137b1 may connect to each other to form a single continuous hole, as shown in FIG. 4A, and the second upper hole 137b2 may have a diameter that is larger than that of the second lower hole 137b1. Depending on the rotational state of the second wing 134b, the second upper hole 137b2 or the second lower hole 137b1 may be disposed on the lens hole 161a.

The second wing support 133b is disposed on one side of the second wing 134b, and may extend perpendicularly from the surface of the second wing 134b. The second wing holder 132b may be connected to a lower side of the second wing support 133b. A lower side of the second wing holder 132b may be seated on an upper surface of the protrusion 64 of the lens barrel 160, and may move along the upper surface of the protrusion 64 in a specific angle range. The second wing support 133b has a shape that is similar to or the same as that of the first wing support 133a, and may be disposed to be symmetrical to the first wing support 133a with respect to the lens hole 161a.

The second wing holder 132b may be disposed under the second wing support 133b. The second wing holder 132b may prevent movement by the second wing part 130_2 in the Z-axis direction when the second wing holder 132b abuts the inner surface of the stopper 120. The second wing holder 132b may have a shape that is substantially similar to or the same as that of the first wing holder 132a, except for the lever 139. The second wing holder 132b may be seated on an upper surface of the first movable carrier 150.

The connection hole 135b may be provided on one side of the second wing 134b and may have a specific length. The connection boss 135a provided in the first wing 134a may be inserted into the connection hole 135b. The connection boss 135a seated in the connection hole 135b may be moved along an inner peripheral surface of the connection hole 135b. The connection hole 135b may have a curved shape. Accordingly, while the first wing 134a is rotated, the second wing 134b may also be rotated because the connection boss 135a moves along the curved inner peripheral surface of the connection hole 135b.

Referring to FIGS. 3 to 4D, the size of the overlapping area of the first wing part 130_1 and the second wing part 130_2 may vary according to the control of the aperture driving module 170 coupled to the lever 139. According to an embodiment, when the first wing part 130_1 and the second wing part 130_2 are maximally overlapping, the first lower hole 137a1 of the first wing part 130_1 and the second lower hole 137b1 of the second wing part 130_2 overlap each other on the lens hole 161a. As the periphery of the first wing 134a contacts a boss formed in the second wing support 133b (not shown), rotation of the first wing 134a and the second wing 134b may be stopped. Further, when the first wing part 130_1 and the second wing part 130_2 are minimally overlapping, the first upper hole 137a2 of the first wing part 130_1 and the second upper hole 137b2 of the second wing part 130_2 overlap each other on the lens hole 161a. Then, the overlapping of the first wing 134a and the second wing 134b is minimal when the connection boss 135a is stopped by the connection hole 135b.

The first movable carrier 150 may be fixedly coupled to the middle barrel 62 of the lens barrel 160, such that the protrusion 64 and the upper barrel 63 upwards protrudes from the first movable carrier 150, and the lower barrel 61 downwards protrudes from the first movable carrier 150. Sides of the wing holders of the variable aperture 130 may be seated on the first movable carrier 150. According to an embodiment, the first wing holder 132a of the first wing 134a may be seated on one side of the first movable carrier 150, and the aperture fixing unit 140 may be disposed on the upper side of the first movable carrier 150 while covering the first wing holder 132a. Then, the lever 139 extending from the first wing holder 132a may protrude through a recess provided in the aperture fixing unit 140.

Figure 5A:
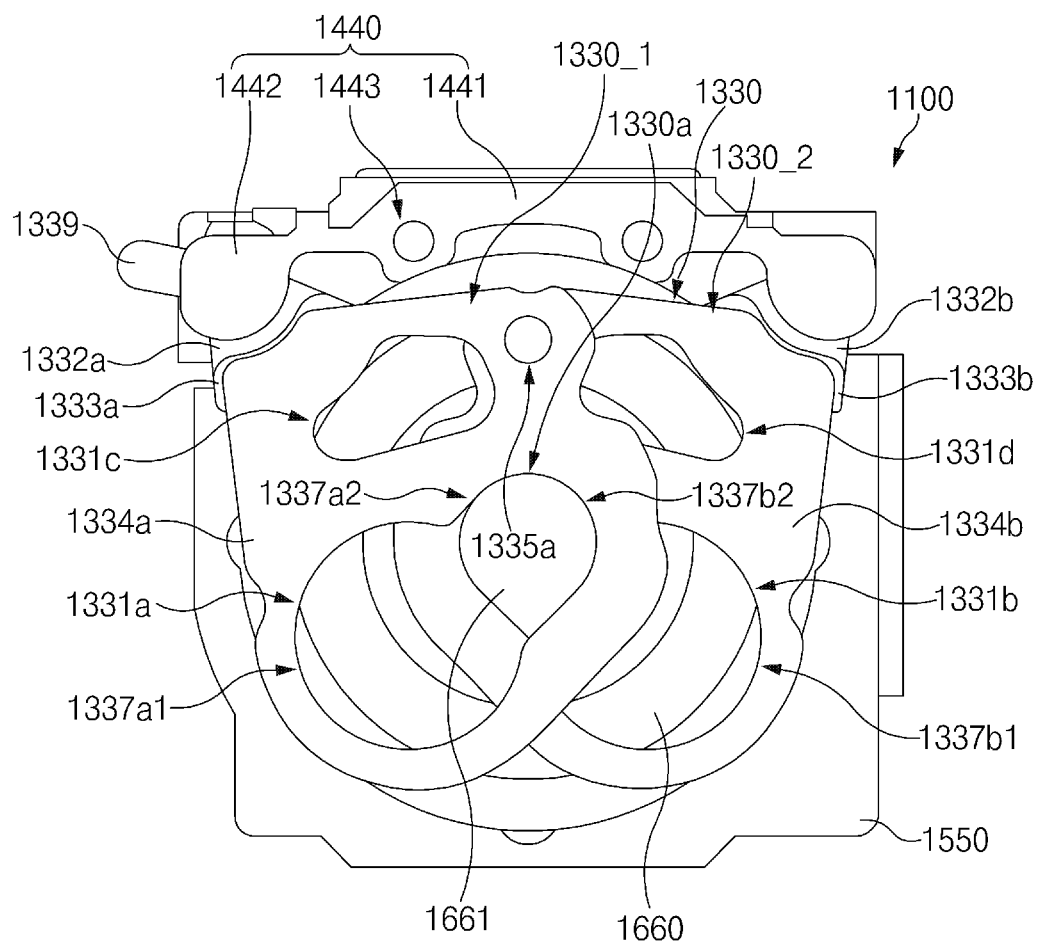
FIG. 5A is a top view illustrating a camera module including a modified variable aperture according to an embodiment of the present disclosure.
Figure 5B:
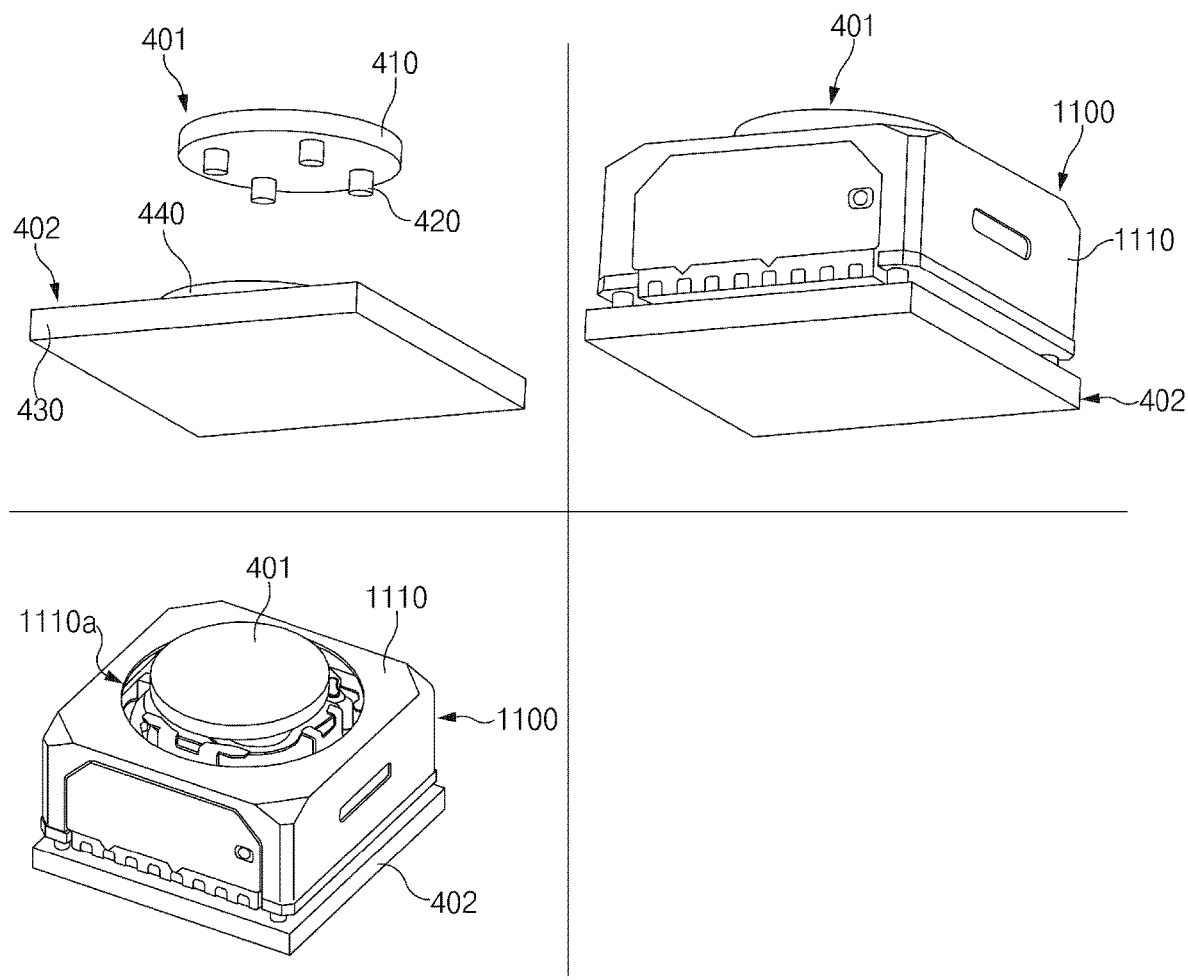
FIG. 5B is views related to a jig process of a camera module including a modified variable aperture according to an embodiment of the present disclosure.

FIG. 5A is a top view illustrating a camera module including a modified variable aperture according to an embodiment of the present disclosure. FIG. 5B is views related to a jig process of a camera module including a modified variable aperture according to an embodiment of the present disclosure.

Referring to FIG. 5A, according to an embodiment of the present disclosure, another embodiment of the camera module 1100 may include a modified variable aperture 1330, an aperture fixing unit 1440, a lens barrel 1660, and a first movable carrier 1550. Additionally, the camera module 1100 may further include other above-described other components such as the shield can and the second movable carrier.

The aperture fixing unit 1440 may include a body 1441, cover areas 1442 configured to cover the first wing holder 1332a and the second wing holder 1332b of the modified variable aperture 1330, and holes 1443, which may be fitted with and fixed to protrusions provided on one side of the first movable carrier 1550.

The modified variable aperture 1330 may include a first wing part 1330_1 and a second wing part 1330_2. They may at least partially overlap each other.

The first wing part 1330_1, for example, may include a first wing 1334a, a first wing support 1333a connected to the first wing 1334a, a first wing holder 1332a connected to the first wing support 1333a, a lever 1339, and a connection boss 1335a. The second wing part 1330_2, for example, may include a second wing 1334b, a second wing support 1333b connected to the second wing 1334b, a second wing holder 1332b connected to the second wing support 1333b, and a connection hole 1335b, into which a connection boss 1335a is inserted. The first wing support 1330_1, the first wing holder 1332a, the lever 1339, and the connection boss 1335a may be substantially the same as or similar to the first wing support, the first wing holder, the lever, and the connection boss described above in FIG. 4A. The second wing support 1330_2, the second wing holder 1332b, and the connection hole 1335b may be substantially the same as or similar to the second wing support, the second wing holder, and the connection hole described above in FIG. 4A.

The first wing 1334a may include a first upper hole 1337a2, a first lower hole 1337a1, and a first jig insertion hole 1331c. A jig may be inserted into the jig insertion hole 1331c. The first upper hole 1337a2 and the first lower hole 1337a1 may be disposed in a lower area of the first wing 1334a.

The first upper hole 1337a2 and the first lower hole 1337a1 may be substantially the same as or similar to the first upper hole and the first lower hole described above in FIG. 4A. The first jig insertion hole 1331c may be disposed in an upper area of the first wing 1334a. Accordingly, a portion of the lens barrel 1660 disposed under the first jig insertion hole 1331c may be exposed by the first jig insertion hole 1331c. The size or shape of the first jig insertion hole 1331c may vary, depending on the design of the camera module 1100.

The second wing 1334b may have a shape that is substantially the same as or similar to that of the first wing 1334a, except for the connection hole 135b, into which the connection boss 1335a is inserted. For example, the second wing 1334b may include a second upper hole 137b2, a second lower hole 137b1, and a second jig insertion hole 1331d. The second jig insertion hole 1331d may be disposed in an upper area of the second wing 1334b.

Referring to FIG. 5B, the jig related to the assembly of the camera module 1100 according to an embodiment of the present disclosure may include a lower jig 402, on which the camera module 1100 is disposed, and an upper jig 401 that presses the camera module 1100 downwards.

The upper jig 401, for example, may include a disk 410 and at least one column 420. The disk 410 may have a size that is smaller than the size of the shield can hole 1110a disposed at a central portion of the shield can 1110. The columns 420, for example, may be four columns disposed under the disk 410. The columns may pass through the first upper hole 1337a2, the second upper hole 1337b2, the first jig insertion hole 1331c, and the second jig insertion hole 1331d in order to press the lens barrel 1660 downwards. In this regard, the stopper substrate 1250 of the stopper 1200 described in FIG. 2B may be assembled with the lens barrel 1660 while the upper jig 401 presses the lens barrel 1660 through the shield can hole 1110a of the shield can 1110 in an unassembled state, and the stopper substrate 1250 of the stopper 1200 may support the lens barrel 1660 after the upper jig 401 is removed The lower jig 402, for example, may include a central disk 440 facing the seating part hole 190a provided in the housing 190, and a support substrate 430 disposed under the central disk 440. Additionally, at least one recess may be disposed in a corner area of the support substrate 430, such that the recess couples to a boss disposed under the housing 190. For example, the substrate 430 may include four recesses for four bosses of the housing 190.

Figure 6A:
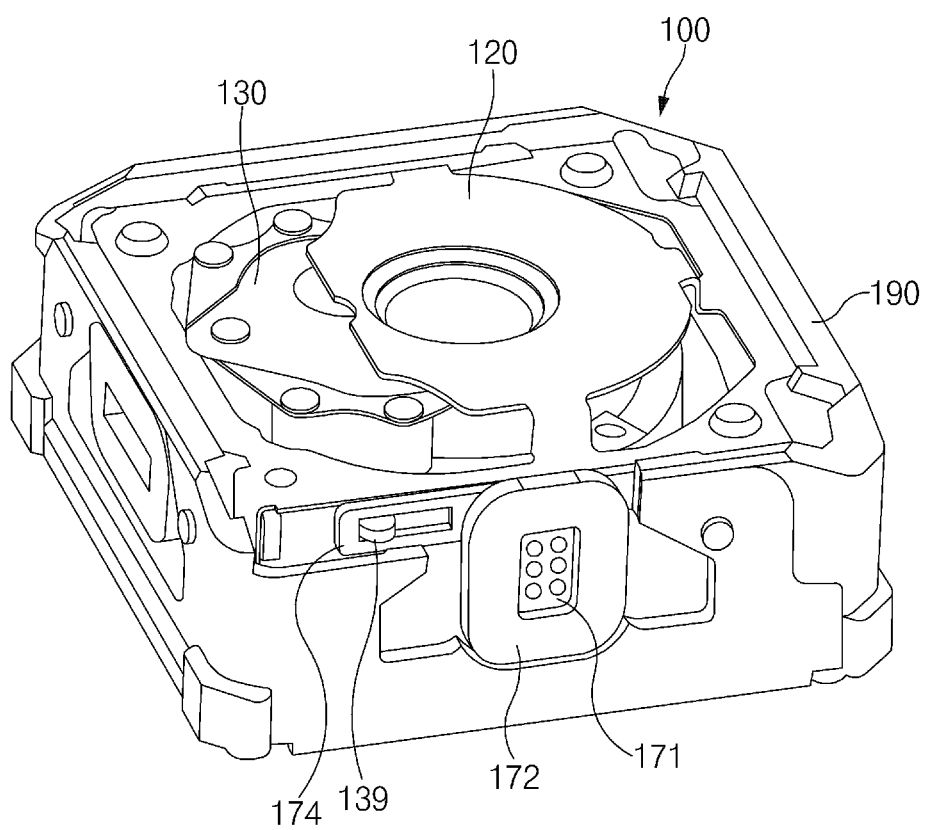
FIG. 6A is a perspective view illustrating a first state of a camera module according to a change of a variable aperture according to an embodiment of the present disclosure.
Figure 6B:
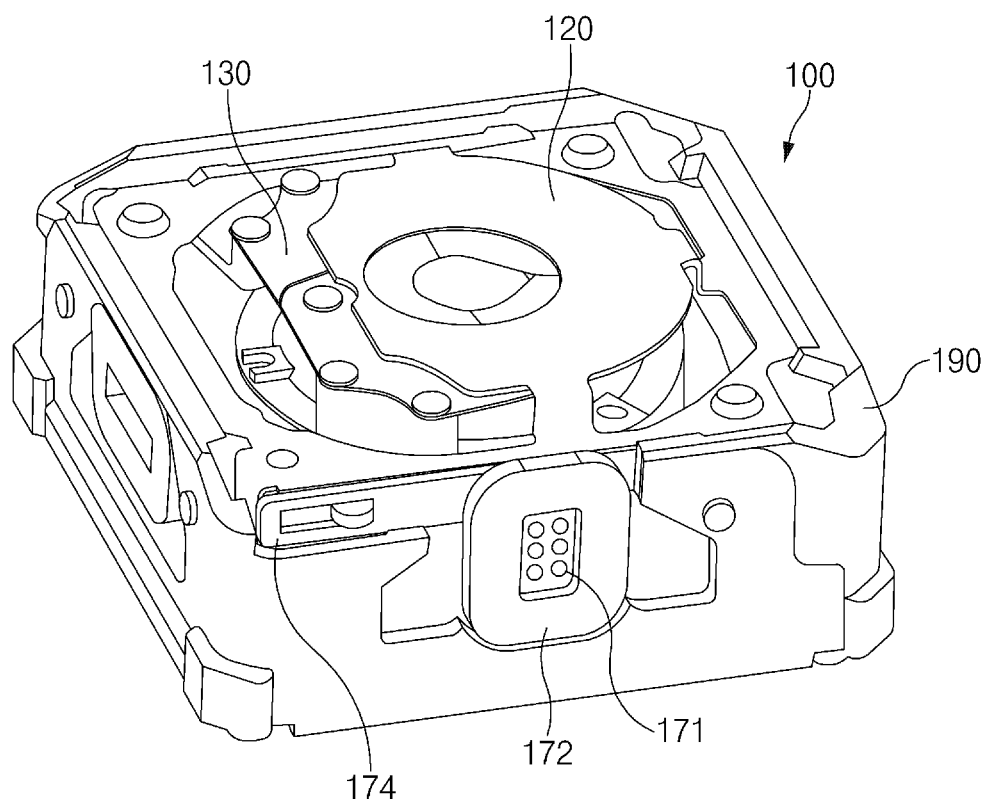
FIG. 6B is a perspective view illustrating a second state of a camera module according to a change of a variable aperture according to an embodiment of the present disclosure.

FIG. 6A is a perspective view illustrating a first state of a camera module according to a change of a variable aperture according to an embodiment of the present disclosure. FIG. 6B is a perspective view illustrating a second state of a camera module according to a change of a variable aperture according to an embodiment of the present disclosure.

Referring to FIGS. 6A and 6B, in the camera module 100 according to an embodiment of the present disclosure, the shield can 110 having a shield can hole 110a surrounds the outside of the camera module 100 and the housing 190 may be coupled to the shield can 110 to provide an enclosure for the camera module 100. The lens barrel 160, which is coupled to the first movable carrier 150 and the second movable carrier 180, may be seated in the housing 190. The stopper 120, a central portion of which protrudes through the shield can hole 110a, may be disposed inside the housing 190. The peripheral area 121 and the leads 124 of the upper substrate 125 of the stopper 120 may be disposed within the shield can 110, while the stopper substrate 122 and the connecting portions 123 of the upper substrate 125 may protrude through the shield can hole 110a. The stopper hole 120a may coincide with the lens hole 161a of the lens barrel 160 such that external light may enter the lens hole 161a. The size of the stopper hole 120a, for example, may be the same as, smaller, or larger than the size of the lens hole 161a.

The aperture driving module 170 may be disposed on one side of the housing 190. A portion of a side of the shield can 110 may be removed such that at least a portion (e.g., the aperture coil 172 or the aperture driving IC 171) of the aperture driving module 170 is exposed. The exposed aperture coil 172, for example, may be connected to a control unit of the electronic device, in which the camera module 100 is mounted. An electrical current may be supplied to the aperture coil 172 under the control of the aperture driving IC 171. In that case, the fourth magnet member 173 disposed in the support 174 may move the support 174 in a first direction. When another current in the reverse direction is applied, the fourth magnet member 173 disposed in the support 174 may move the support 174 in a second direction. In turn, the lever 139 may be moved in the first and second direction.

Referring to FIG. 6A, if the lever 139 is moved in one direction (e.g., the rightward direction in the figure) by the motion of the support 174, the first wing part 130_1 and the second wing part 130_2 may be moved to increasingly overlap, to the point where the first lower hole 137a1 of the first wing 134a and the second lower hole 137b1 of the second wing 134b completely overlap each other. Accordingly, the first lower hole 137a1 and the second lower hole 137b1 may provide a relatively large aperture for the camera module 100.

Referring to FIG. 6B, if the lever 139 is moved in the opposite direction (e.g., the leftward direction in the figure) by the motion of the support 174, the first wing part 130_1 and the second wing part 130_2 may be moved so that their overlap decreases, to the point where the first upper hole 137a2 of the first wing 134a and the second upper hole 137b2 of the second wing 134b completely overlap each other. Accordingly, the first upper hole 137a2 and the second upper hole 137b2 may provide a relatively small aperture for the camera module 100.

As described above, the camera module 100 according to an embodiment of the present disclosure may adjust the aperture for the transmission of light, by using the variable aperture 130 disposed on the lens barrel 160. According to an embodiment, the state shown in FIG. 6A may be appropriate for a first photographing function (e.g., pan-focusing) that requires a relatively large amount of light, while the state shown in FIG. 6B may be appropriate for a second photographing function (e.g., zoom-focusing) that requires a relatively small amount of light.

Figure 6C:
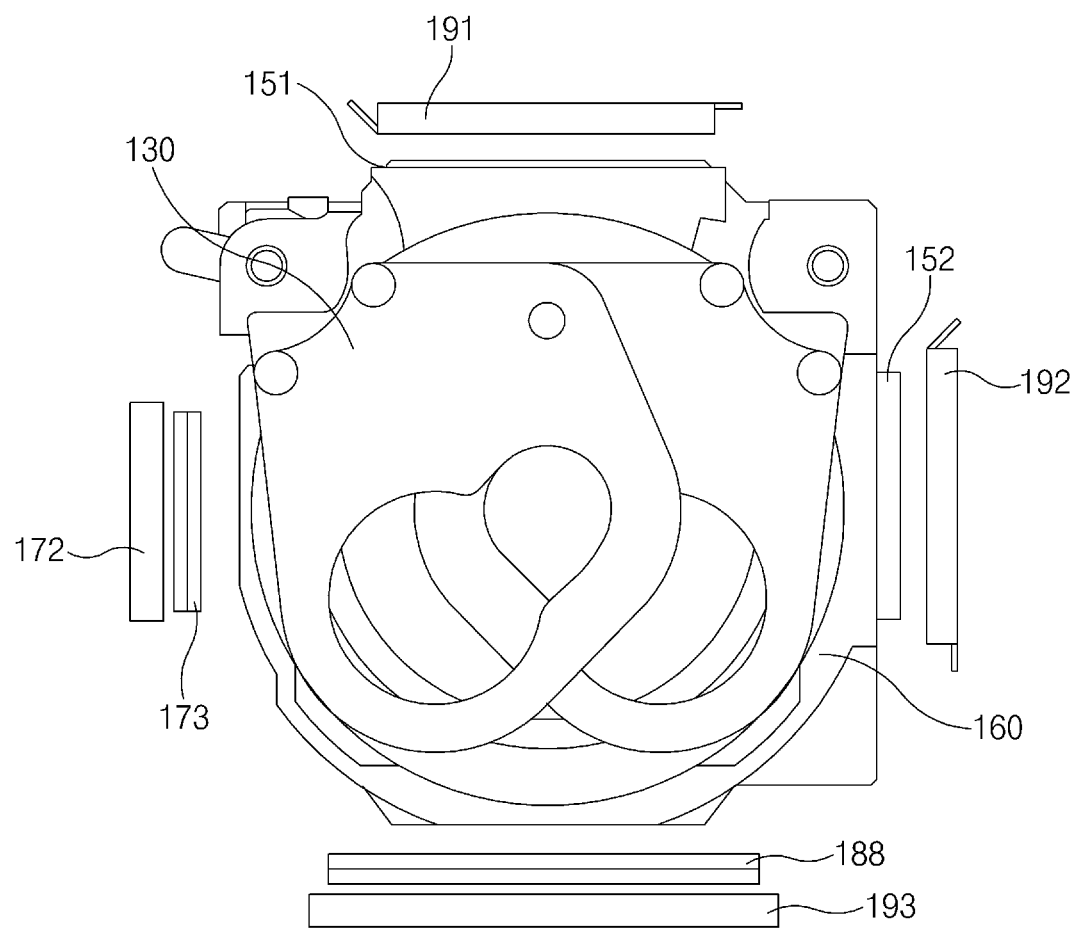
FIG. 6C is a top view illustrating a lens barrel according to an embodiment of the present disclosure.

FIG. 6C is a top view illustrating a lens barrel according to an embodiment of the present disclosure;

Referring to FIG. 6C, the camera module according to an embodiment of the present disclosure may include a lens barrel 160, a variable aperture 130, at least one side of which is fixed to an upper side of the lens barrel 160, a first magnet member 151 and a first coil 191, a second magnet member 152 and a second coil 192, a third magnet member 188 and a third coil 193, and a fourth magnet member 173 and an aperture coil 172.

The first magnet member 151 and the first coil 191 may compensate vertical shakiness of the camera module (for example, when the user's hand holding the camera module is unsteady), by moving the lens barrel 160 downwards or upwards. Because the variable aperture 130 is coupled with the lens barrel 160, the variable aperture 130 may be moved upwards and downwards together with the lens barrel 160.

The second magnet member 152 and the second coil 192 may compensate horizontal shakiness of the camera module by moving the lens barrel 160 leftwards or rightwards by a specific distance.

The third magnet member 188 and the third coil 193 may support an auto-focusing function by moving the lens barrel 160 in the Z-axis direction (the Z-axis being orthogonal to the plane of the figure).

The fourth magnet member 173 and the aperture coil 172 may be used to adjust the size of the aperture hole of the variable aperture 130, as described above.

As described above, the camera module according to an embodiment of the present disclosure may a module to compensate for shakiness of the camera module. The compensation module, for example, may include a first compensation module (e.g., the first coil 191 and the first magnet member 151) disposed on a first side surface of the lens barrel 160 (or a carrier or a housing surrounding the lens barrel 160) to compensate shakiness in the X-axis direction, and a second compensation module (e.g., the second coil 192 and the second magnet member 152) disposed on a second side surface of the lens barrel 160 to compensate shakiness in the Y-axis direction. The first and second side surfaces may be adjacent to each other and form a ninety degree angle. Further, the camera module may include an auto-focusing module AF disposed on a third side surface of the lens barrel 160. For example, the AF module may include a third magnet member 188 and a third coil 193. In addition, the camera module may include an aperture driving module disposed on a fourth side surface of the lens barrel 160. The aperture driving module, for example, may include a fourth magnet member 173 and an aperture coil 172.

As described above, according to an embodiment of the present disclosure, the camera module may support variable aperture, auto focus, and shakiness compensation in two axes without generating interferences between the magnets or coils used in the modules for variable aperture, auto focus, and shakiness compensation.

According to various embodiments, a camera module or an electronic device according to an embodiment may include a lens barrel including at least one lens and a lens hole such that light may be input through the lens hole, a pair of variable apertures including an aperture hole area arranged on the lens hole and configured to adjust the size of a hole by a physical force applied to a lever; a hand-shaking compensating module disposed on a first side surface and a second side surface of the lens barrel and configured to compensate hand shaking in a first axis direction and a second axis direction, an auto-focusing module disposed on a third side surface of the lens barrel and configured to support a motion of the lens barrel in a third axis direction, related to the auto-focusing function, and an aperture driving module disposed on a fourth side surface of the lens barrel and configured to adjust the aperture hole of the variable aperture.

According to various embodiments, the hand-shaking compensating module may include a magnet member and a coil on a first side surface of the lens barrel and a second side surface that is adjacent to the first side surface and forming a specific angle with the first side surface on a horizontal plate, and the hand-shaking is compensated by moving the lens barrel in at least one of the X-axis and Y-axis directions on a horizontal plane.

According to various embodiments, the autofocusing module may include a magnet member and a coil on a third side surface that is adjacent to the second side surface and forming a specific angle with the second side surface, and may be disposed to adjust the focusing by moving the lens barrel in the Z-axis direction.

According to various embodiments, the aperture driving module may include a magnet member and a coil on a fourth side surface that is adjacent to the first side surface and forming a specific angle with the first side surface, and may be disposed to adjust the size of the aperture hole area through a movement in the X-axis direction.

Figure 7A:
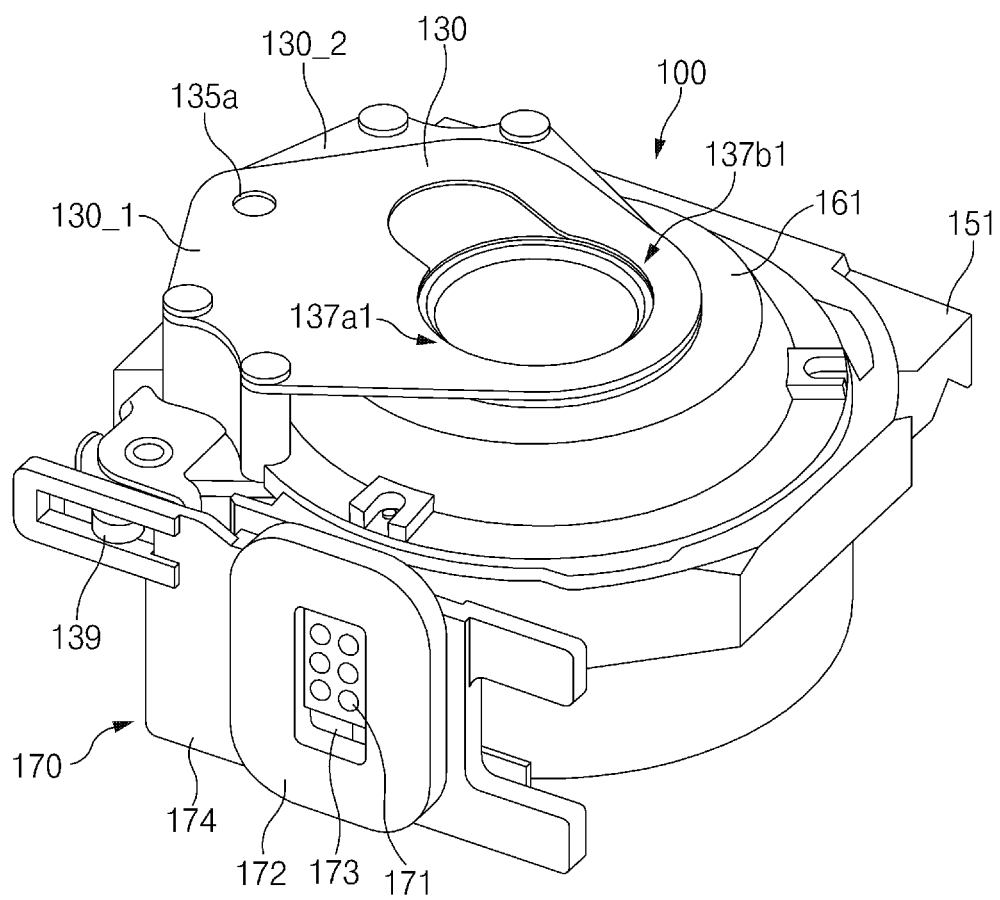
FIG. 7A is a perspective view illustrating a variable aperture of a first state according to an embodiment of the present disclosure.
Figure 7B:
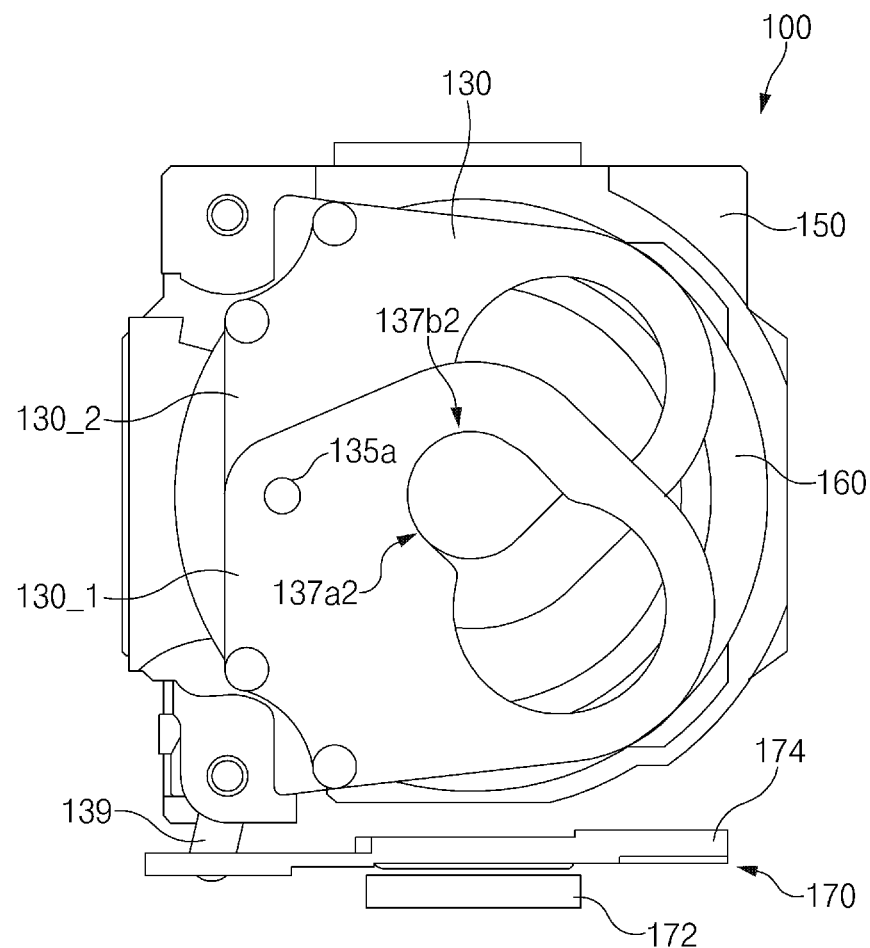
FIG. 7B is a top view illustrating a variable aperture of a second state according to an embodiment of the present disclosure.

FIG. 7A is a perspective view illustrating a variable aperture of a first state according to an embodiment of the present disclosure. FIG. 7B is a top view illustrating a variable aperture of a second state according to an embodiment of the present disclosure.

Referring to FIG. 7A, in the camera module 100 according to an embodiment of the present disclosure, when the aperture driving module 170 is moved in one direction (e.g., the rightward direction in the figure), the lever 139 inserted into the holding hole of the support 174 may be moved rightwards in correspondence to the movement of the support 174. Accordingly, the first wing part 130_1 connected to the lever 139 may be rotated counterclockwise. In correspondence to the rotation of the first wing part 130_1, the second wing part 130_2 connected through the connection boss 135*a* may be rotated clockwise. Accordingly, as illustrated, the first lower hole 137*a*1 of the first wing and the second lower hole 137*b*1 of the second wing may overlap each other.

Referring to FIG. 7B, in the camera module 100 according to an embodiment of the present disclosure, when the aperture driving module 170 is moved in another direction (e.g., the leftward direction in the figure), the lever 139 inserted into the holding hole of the support 174 may be moved leftwards in correspondence to the movement of the support 174. Accordingly, the first wing part 130_1 connected to the lever 139 may be rotated clockwise. In correspondence to the rotation of the first wing part 130_1, the second wing part 130_2 connected through the connection boss 135*a* may be rotated counterclockwise. Accordingly, as illustrated, the first upper hole 137*a*2 of the first wing and the second upper hole 137*b*2 of the second wing may overlap each other.

Figure 7C:
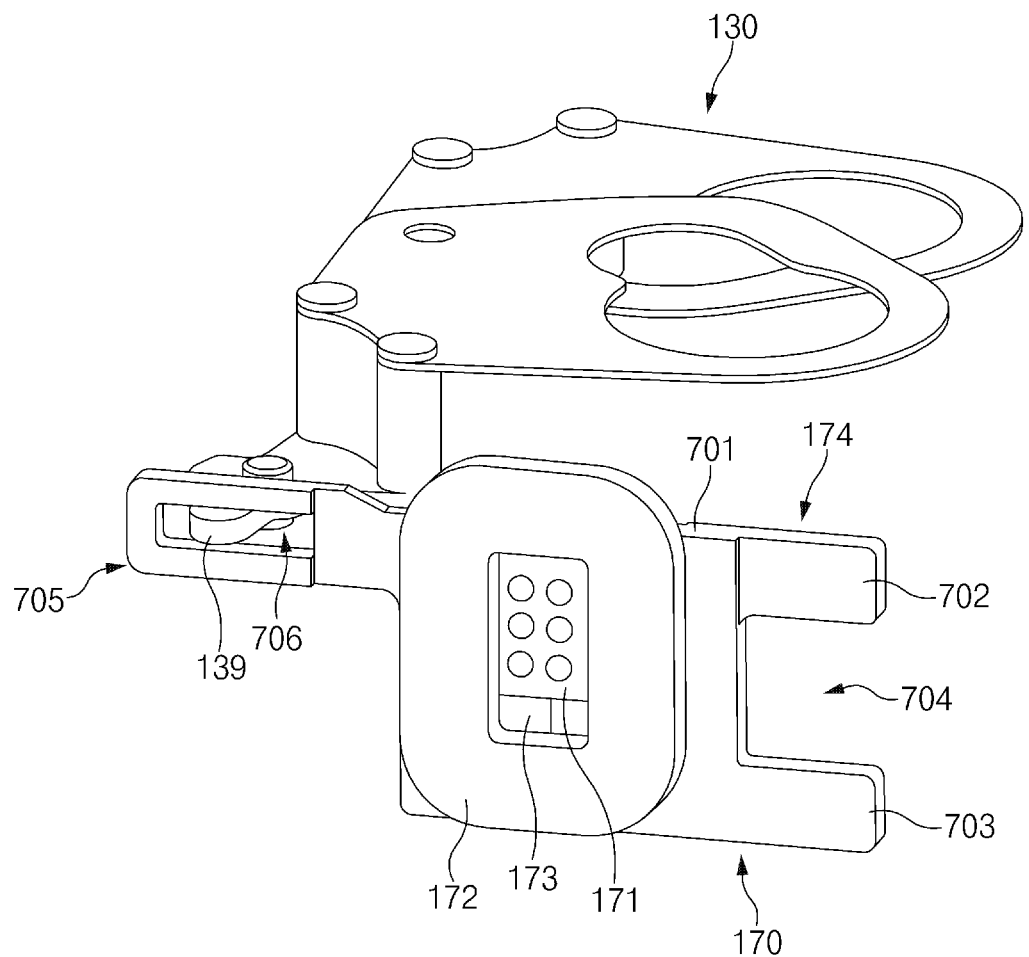
FIG. 7C is a perspective view illustrating a variable aperture and an aperture driving module according to an embodiment of the present disclosure.
Figure 7D:
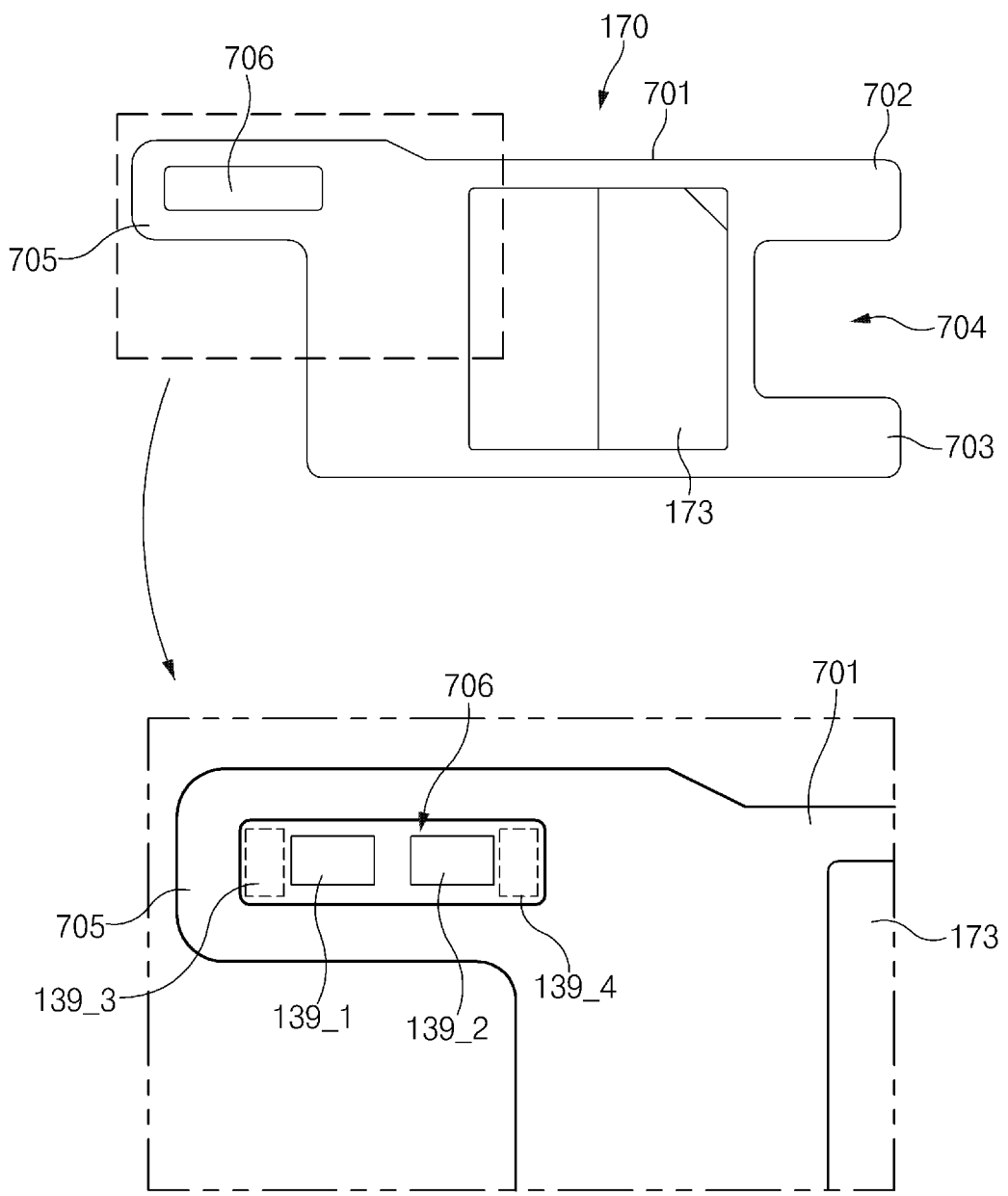
FIG. 7D is a side view illustrating an aperture driving module according to an embodiment of the present disclosure.

FIG. 7C is a perspective view illustrating a variable aperture and an aperture driving module according to an embodiment of the present disclosure. FIG. 7D is a side view illustrating an aperture driving module according to an embodiment of the present disclosure.

Referring to FIGS. 7C and 7D, the aperture driving module 170 may include a support 174, an aperture driving IC 171, a fourth magnet member 173, and an aperture coil 172.

The support 174 may include a central body 701, on which the fourth magnet member 173 is seated, a first extending portion 702 extending from an end of one side of the central body 701 in one direction, a second extending portion 703 extending in the same direction and disposed in parallel to the first extending portion 702, a holding recess 704 defined by the first extending portion 702 and the second extending portion 703, and a lever holder 705 in which the holding hole 706 is formed. According to an embodiment, the lever holder 705 and the first extending portion 702 may be on opposite sides of the central body 701.

The holding hole 706 may comprise several regions. For example, the holding hole 706 may include a first location 139_1 which is where the lever 139 is located when the first upper hole 137*a*2 and the second upper hole 137*b*2 overlap each other. The holding hole 706 may also include a second location 139_2 which is where the lever 139 is located when the first lower hole 137*a*1 and the second lower hole 137*b*1 overlap each other. The holding hole 706 may further include a first guard hole area 139_3 to the left of the first location 139_1 and a second guard hole area 139_4 to the right of the second location 139_2. The first guard hole area 139_3 and the second guard hole area 139_4 may be large enough such that when the camera module 100 is compensating for shakiness, the lever 139 does not come into contact with the lever holder 705. For example, when the compensation of shakiness of the camera module 100 is designed to be within 0.3 mm (e.g., 0.3 mm in the +X-axis direction and 0.3 mm in the −X axis direction), the first guard hole area 139_3 and the second guard hole area 139_4 may have widths of 0.3 mm.

According to one embodiment, in relation to the compensation of shakiness in the Y-axis direction, the lever 139 may protrude into the lever holder 705 by a distance greater than the designed Y-axis compensation distance, such that the lever 139 does not disengage from the lever holder 705, even when Y-axis compensation occurs. For example, when the Y-axis compensation of shakiness of the camera module 100 is designed to be within 0.3 mm (e.g., 0.3 mm in the +Y-axis direction and 0.3 mm in the −Y axis direction), the camera module may be designed such that the lever 139 exceeds the lever holder 705 by 0.4 mm.

A processor (or a driving IC of the aperture driving module 170) of an electronic device, in which the camera module 100 is mounted, may operate the lever 139 such that a marginal area is left in anticipation of shakiness compensation. For example, in order to bring the variable aperture 130 into a first state (e.g., the state where the lower holes in the wing parts overlap), the processor may control the aperture driving module 170 such that the support 174 moves in a first direction by a first distance (e.g., the distance that make the aperture hole as large as possible). Thereafter, the processor may move the support 174 by a second distance (e.g., a distance related to the compensation of hand shaking) in a second direction opposite the first direction such that the first guard hole area 139_3 will have a sufficiently large width. Similarly, in order to bring the variable aperture 130 into a second state (e.g., the state in where the upper holes in the wing parts overlap), the processor may control the aperture driving module 170 such that the support 174 moves in the second direction by a third distance (e.g., the distance that make the aperture hole as small as possible). Thereafter, the processor may move the support 174 by a fourth distance (e.g., a distance related to the compensation of hand shaking) in the first direction such that the second guard hole area 139_4 will have a sufficiently large width.

Figure 7E:
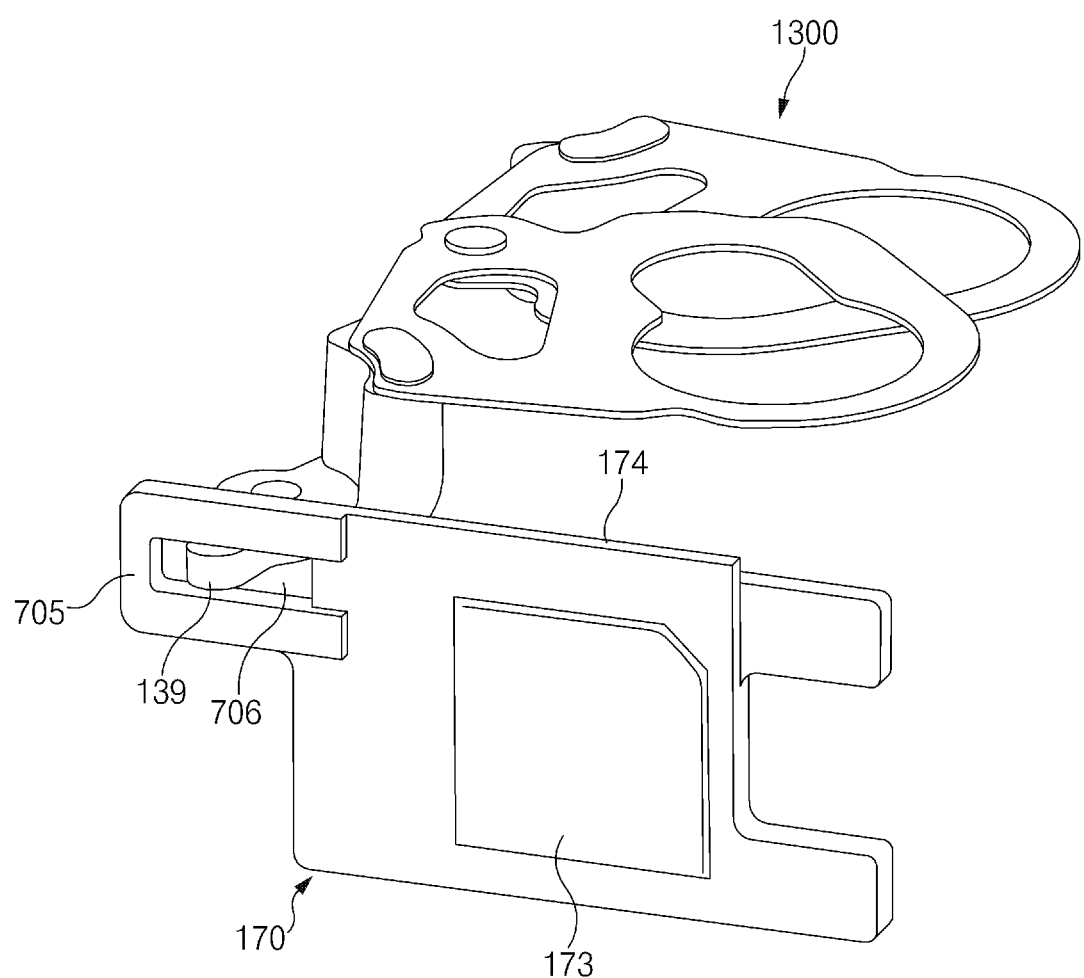
FIG. 7E is a view illustrating parts of a modified variable aperture and an aperture driving module according to an embodiment of the present disclosure.

FIG. 7E is a perspective view illustrating parts of a modified variable aperture and an aperture driving module according to an embodiment of the present disclosure.

Referring to FIG. 7E, the camera module 100 according to an embodiment of the present disclosure may include a lever 139 disposed on one side of the modified variable aperture 1300, and the lever 139 may be inserted into the holding hole 706 of the lever holder 705. As described above, the modified variable aperture 1300 may further include a jig insertion hole, in addition to the upper and lower holes constituting the aperture hole.

The aperture driving module 170 may include a support 174, by which the lever 139 is inserted into the holding hole 706, and a fourth magnet member 173 may be disposed on one side of the support 174. Additionally, as described above, the aperture driving module 170 may further include an aperture coil that cooperates with the fourth magnet member 173, and an aperture driving IC.

Figure 8A:
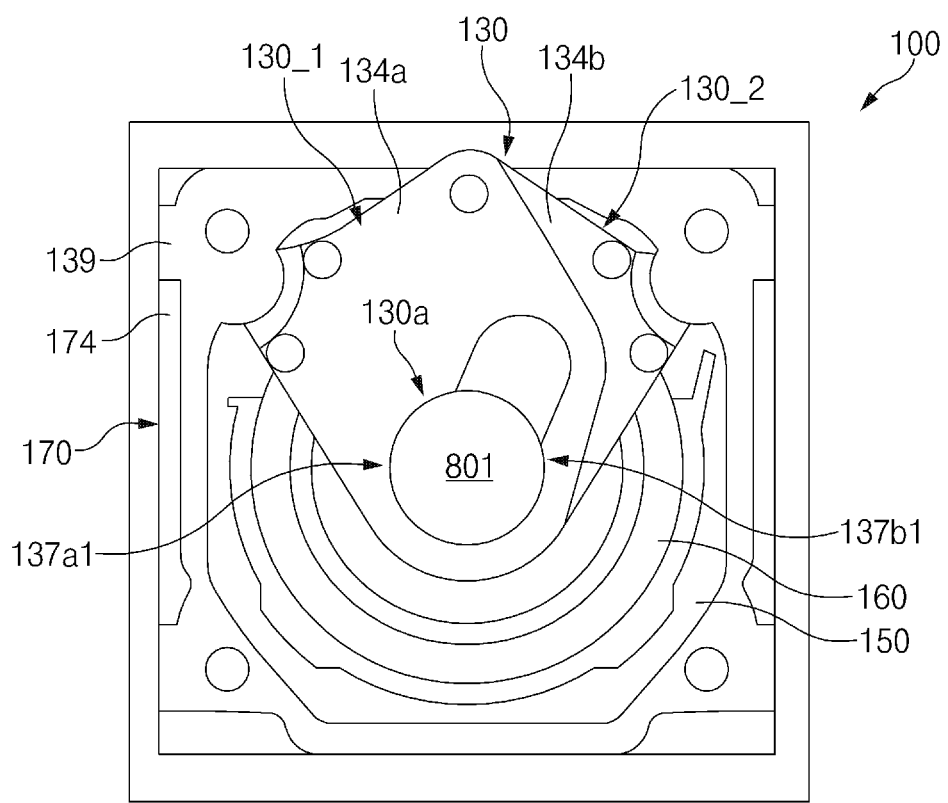
FIG. 8A is a view illustrating various examples of a first adjustment state of an aperture hole area of a variable aperture according to an embodiment of the present disclosure.
Figure 8B:
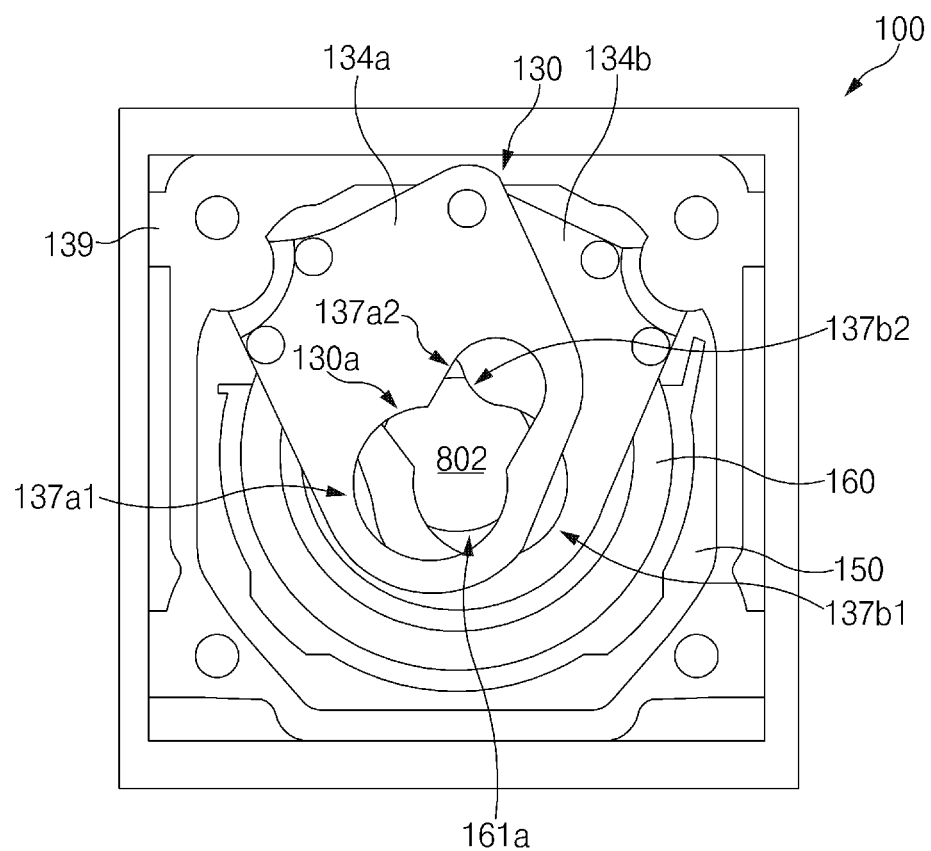
FIG. 8B is a view illustrating various examples of a second adjustment state of an aperture hole area of a variable aperture according to an embodiment of the present disclosure.
Figure 8C:
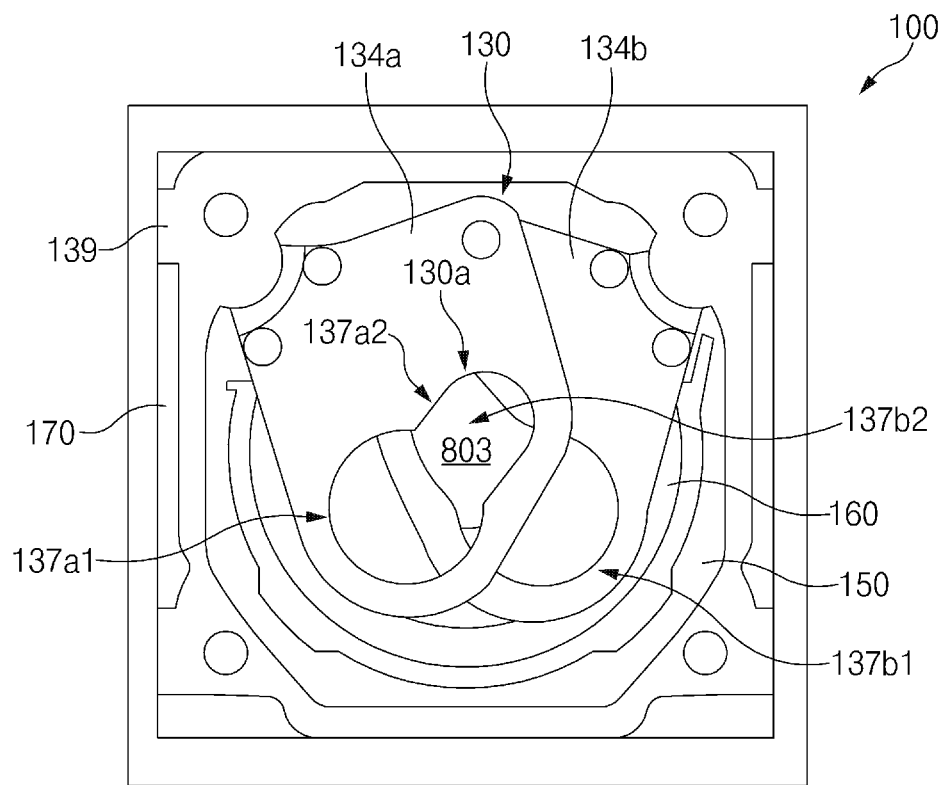
FIG. 8C is a view illustrating various examples of a third adjustment state of an aperture hole area of a variable aperture according to an embodiment of the present disclosure.
Figure 8D:
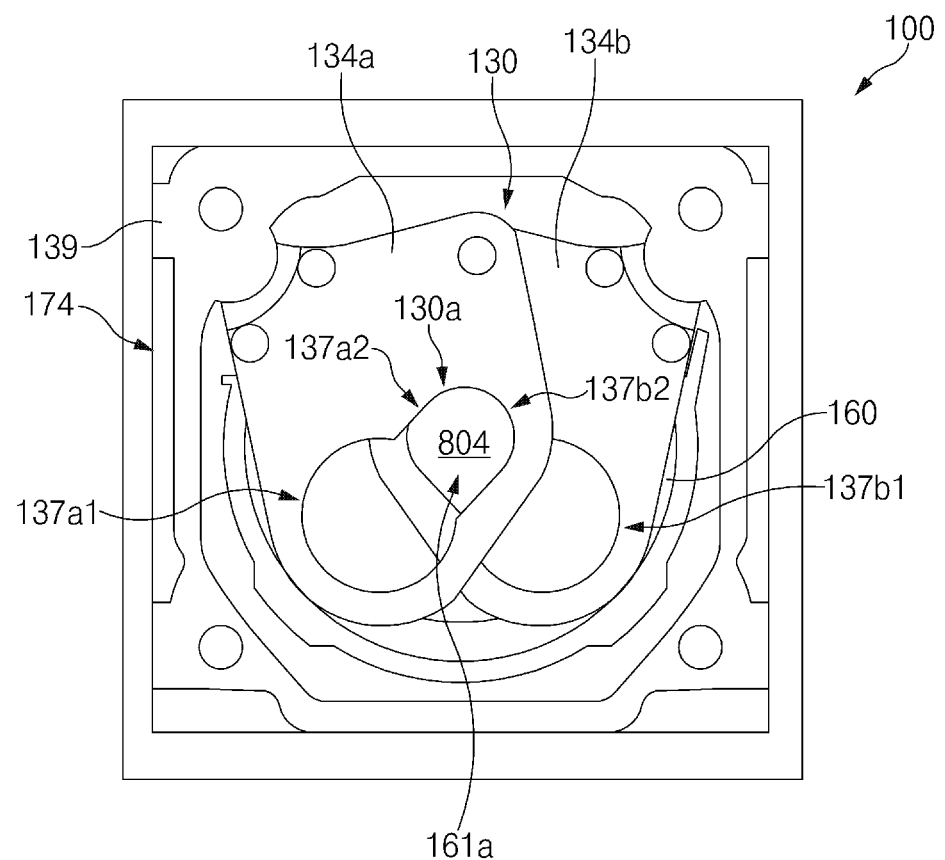
FIG. 8D is a view illustrating various examples of a fourth adjustment state of an aperture hole area of a variable aperture according to an embodiment of the present disclosure.

FIG. 8A is a view illustrating various examples of a first adjustment state of an aperture hole area of a variable aperture according to an embodiment of the present disclosure. FIG. 8B is a view illustrating various examples of a second adjustment state of an aperture hole area of a variable aperture according to an embodiment of the present disclosure. FIG. 8C is a view illustrating various examples of a third adjustment state of an aperture hole area of a variable aperture according to an embodiment of the present disclosure. FIG. 8D is a view illustrating various examples of a fourth adjustment state of an aperture hole area of a variable aperture according to an embodiment of the present disclosure;

Referring to FIG. 8A, a first adjustment state 801 of the aperture hole area 130a provides a large aperture hole as the first lower hole 137a1 of the first wing 134a and the second lower hole 137b1 of the second wing 134b overlap each other. In this regard, the aperture driving module 170 may operate the lever 139 disposed in the first wing part 130_1 such that the first wing 134a and the second wing 134b rotate inward. In doing so, the lever 139 may be moved downwards with respect to the illustrated drawing and may be moved by a maximum movable distance. When the maximum movable distance is reached, the aperture fixing unit 140 may stop the movement of the lever 139. According to various embodiments, the support 174 of the aperture driving module 170 may be designed so that the movement of the lever 139 does not exceed the maximum movable distance.

Referring to FIG. 8B, a second adjustment state 802 of the aperture hole area 130a provides a star-shaped aperture hole as portions of the first lower hole 137a1, the second lower hole 137b1, the second upper hole 137b2, and the first upper hole 137a2 overlap each other. In this regard, the aperture driving module 170 may operate the lever 139 disposed in the first wing part 130_1 such that the first wing 134a and the second wing 134b move outwards from the first adjustment state 801. In the second adjustment state 802, the lens hole 161a may be partially covered by the variable aperture 130. The second adjustment state 802 may be an intermediate state between the first adjustment state 801 and the fourth adjustment state 804 described in FIG. 8D. Further, the second adjustment state 802 may be used for specific photographing functions.

Referring to FIG. 8C, a third adjustment state 803 of the aperture hole area 130a may provide a diamond-shaped aperture hole as portions of the first lower hole 137a1, the second lower hole 137b1, the second upper hole 137b2, and the first upper hole 137a2 overlap each other. In this regard, the aperture driving module 170 may operate the lever 139 disposed in the first wing part 130_1 such that the first wing 134a and the second wing 134b move outwards from the second adjustment state 802. The aperture provided in the third adjustment state 803 may be smaller than that provided in the second adjustment state 802. The third adjustment state 803 may be an intermediate state between the first adjustment state 801 and the fourth adjustment state 804 described in FIG. 8D. Further, the third adjustment state 803 may be used for specific photographing functions.

Referring to FIG. 8D, a fourth adjustment state 804 of the aperture hole area 130a may provide a small aperture hole as the first upper hole 137a2 of the first wing 134a and the second upper hole 137b2 of the second wing 134b overlap each other. In this regard, the aperture driving module 170 may operate the lever 139 disposed in the first wing part 130_1 such that the first wing 134a and the second wing 134b rotate outward by a maximum angle. The fourth adjustment state 804 may provide the smallest possible aperture hole. The fourth adjustment state 804 may be temporarily fixed as the corresponding photographing function is executed.

According to various embodiments, the above-described second adjustment state 802, for example, may be the state in which the lever 139 is moved from the first adjustment state 801 by 0.4 mm. The above-described third adjustment state 803, for example, may be the state in which the lever 139 is moved from the first adjustment state 801 by 0.6 mm. The above-described fourth adjustment state 804, for example, may be the state in which the lever 139 is moved from the first adjustment state 801 by 0.7 mm. These distances may vary depending on, for example, the size of the camera module 100.

Figure 9A:
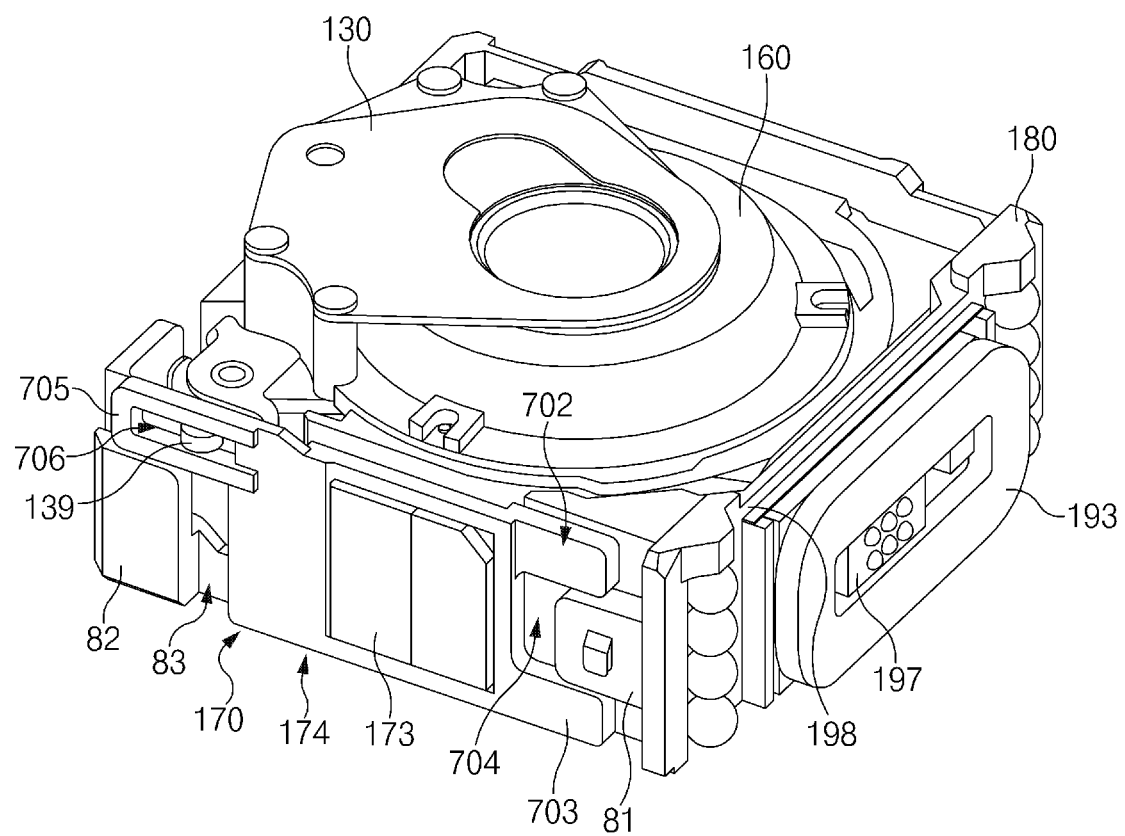
FIG. 9A is a perspective view illustrating a camera module including a second movable carrier according to an embodiment of the present disclosure.
Figure 9B:
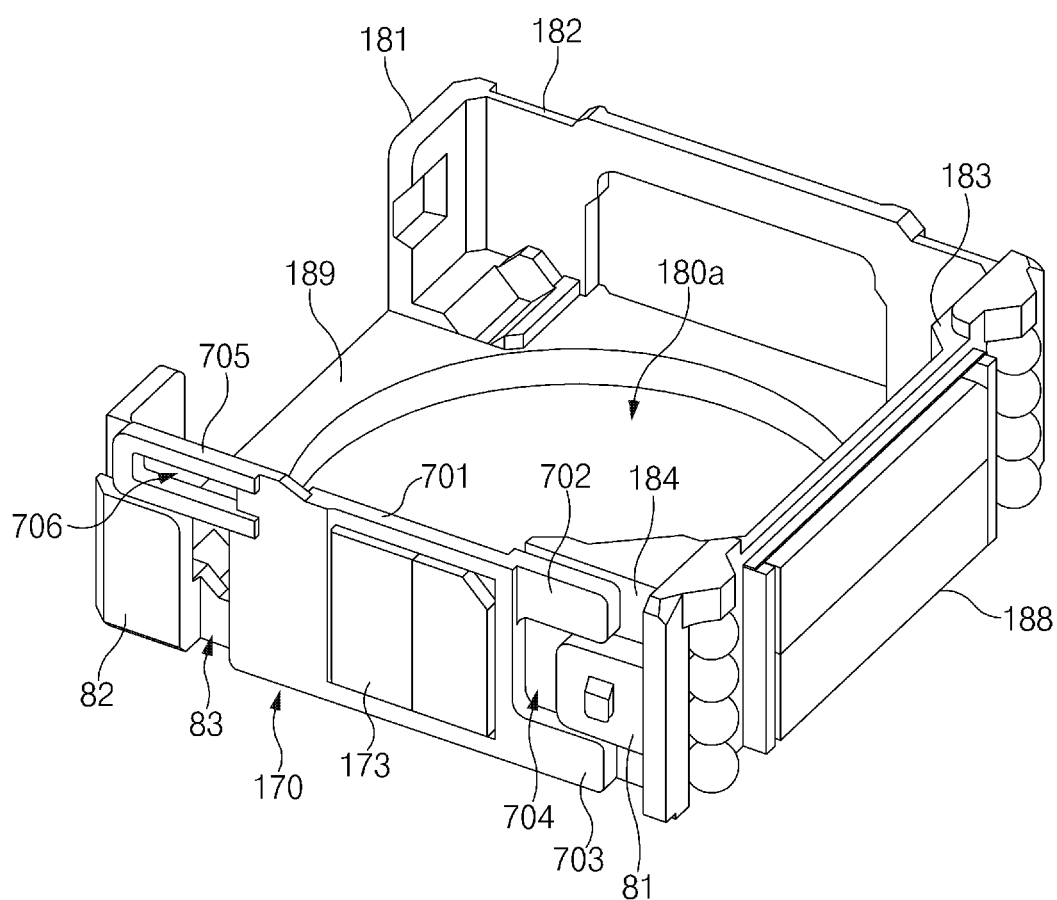
FIG. 9B is a perspective view in a first direction illustrating a second movement carrier according to an embodiment of the present disclosure.
Figure 9C:
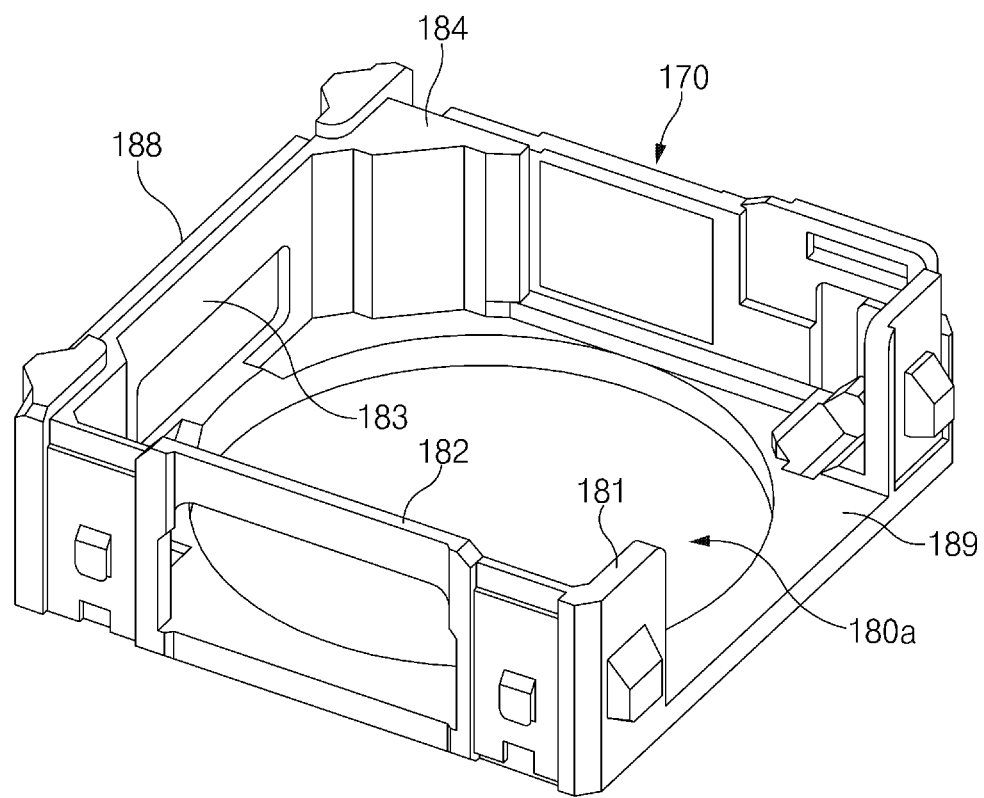
FIG. 9C is a perspective view in a second direction illustrating a second movement carrier according to an embodiment of the present disclosure.

FIG. 9A is a perspective view illustrating a camera module including a second movable carrier according to an embodiment of the present disclosure; FIG. 9B is a perspective view in a first direction illustrating a second movement carrier according to an embodiment of the present disclosure. FIG. 9C is a perspective view in a second direction illustrating a second movement carrier according to an embodiment of the present disclosure.

Referring to FIG. 9A to 9C, the camera module 100, for example, may include a second movable carrier 180 in which the lens barrel 160 is seated, and an aperture driving module 170 configured to drive the variable aperture 130.

The second movable carrier 180 may include the carrier side walls 181, 182, 183, and 183, the through-hole 180a, and the frame 189, which have been described above. The second movable carrier 180 may be moved in an upward/downward direction (e.g. the Z-axis direction). In this regard, the second movable carrier 180 may include the third magnet member 188. The third coil 193 and the focusing driving IC 197 disposed on one side of the housing 190 may face the third magnet member 188. Accordingly, if electric power is supplied to the third coil 193, the third magnet member 188 may interact with the third coil 193 to move the second movable carrier 180 upwards and downwards. While the second movable carrier 180 is moved upwards and downwards by the third magnet member 188, the aperture driving module 170 disposed on one side of the second movable carrier 180 may also be moved.

The aperture driving module 170, in which some configurations are disposed on one side of the second movable carrier 180, may include a fourth magnet member 173 related to driving of the lever 139 of the variable aperture 130. The aperture coil 172, the aperture driving IC, and the like of the aperture driving module 170, which interact with the fourth magnet member 173, may be disposed in the housing 190.

The second movable carrier 180 may include a first step 81, a second step 82, and a seating recess 83 such that the support 174 of the aperture driving module 170 may be seated. The seating recess 83 may have a shape corresponding to the shape of the support 174. The first step 81 may be disposed on one side of the seating recess 83, and the second step 82 may be disposed on an opposite side of the seating recess 83. The first step 81 may protrude from a corner of one side wall of the second movable carrier 180 toward a central portion of the side wall. The first step 81, for example, may be disposed in parallel to the recess 704 formed by the first extending portion 702 and the second extending portion of the support 174. The second step 82 may have a shape that supports one side (e.g., the lower side) of the lever holder 705 of the support 174.

Figure 10A:
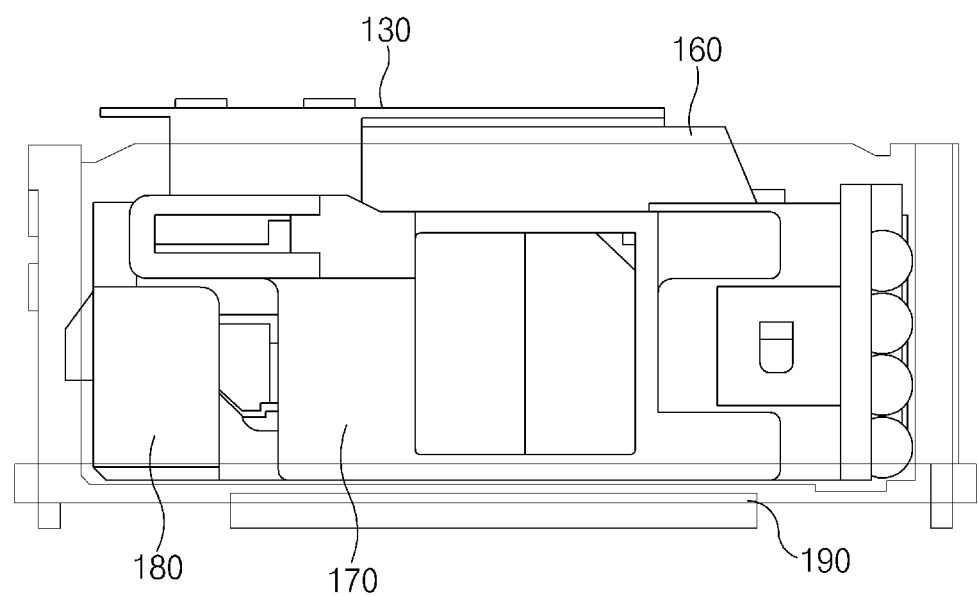
FIG. 10A is a side view illustrating a first state of a Z-axis movement of a camera module according to an embodiment of the present disclosure.
Figure 10B:
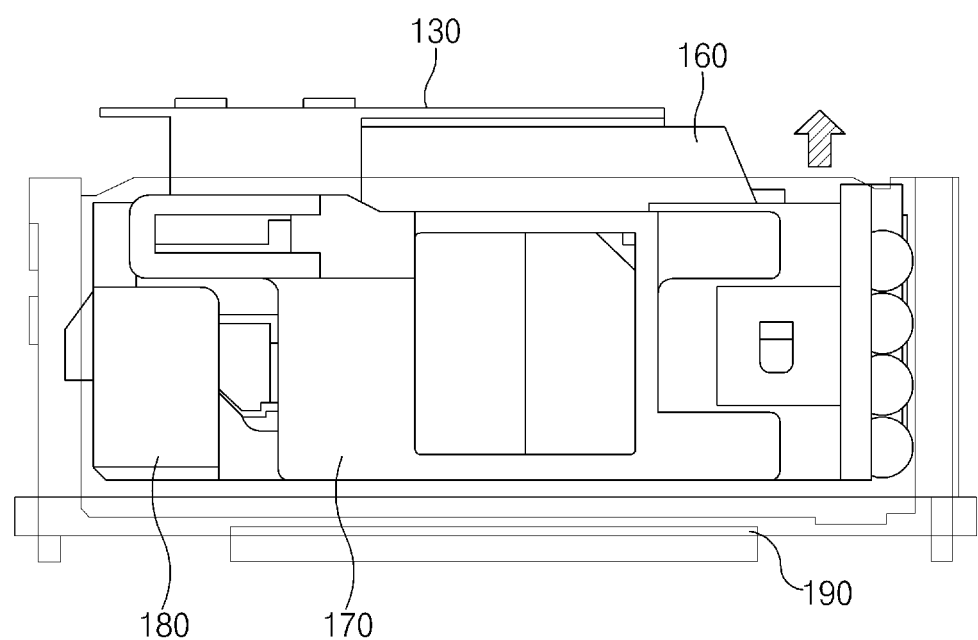
FIG. 10B is a side view illustrating a second state of a Z-axis movement of a camera module according to an embodiment of the present disclosure.

FIG. 10A is a side view illustrating a first state of a Z-axis movement of a camera module according to an embodiment of the present disclosure. FIG. 10B is a side view illustrating a second state of a Z-axis movement of a camera module according to an embodiment of the present disclosure.

Referring to FIG. 10A, when the lens barrel 160 is seated in the housing 190, at least a portion (e.g., the lower portion) of the lens barrel 160 may be located in the seating part hole 190a disposed on the bottom of the housing 190. Correspondingly, the variable aperture 130 positioned on the lens barrel 160 may be located at a first height from the bottom of the housing 190. Some components of the aperture driving module 170 may be disposed adjacent to the bottom of the housing 190. In this state, the variable aperture 130 may be located below the upper surface of the shield can 110. The stopper 120 positioned on the upper side of the variable aperture 130 may be disposed at a height that is substantially similar to the height of the upper surface of the shield can 110.

Referring to FIG. 10B, the lens barrel 160 may be moved in the Z-axis direction, such that at least a portion (e.g., the lower portion) of the lens barrel 160 may be disposed to be spaced apart from the seating part hole of the housing 190 by a specific height. Correspondingly, the variable aperture 130 disposed on the lens barrel 160 may be located at a second height (e.g., above the first height) from the bottom of the housing 190. Further, the second movable carrier 180 may be disposed to be spaced apart from the bottom of the housing 190 by the specific height, and correspondingly, some components of the aperture driving module 170 disposed in the second movable carrier 180 may be spaced apart from the bottom of the housing 190 by the specific height. In this state, the variable aperture 130 may be disposed at the same height as the upper surface of the shield can 110. Accordingly, the stopper 120 may be disposed at a height that is higher than the upper surface of the shield can 110 by protruding through the shield can hole.

According to various embodiments, in relation to the performance of the auto-focusing function of the camera module 100, the second movable carrier 180 may move toward the bottom of the housing 190 or in the opposite direction. If the auto-focusing function of the camera module 100 is executed, a control unit of the camera module 100 or the electronic device, in which the camera module 100 is mounted, may supply electric current of different directions to the third coil 193 such that the second movable carrier 180 moves in the +Z or −Z-axis direction.

Figure 11:
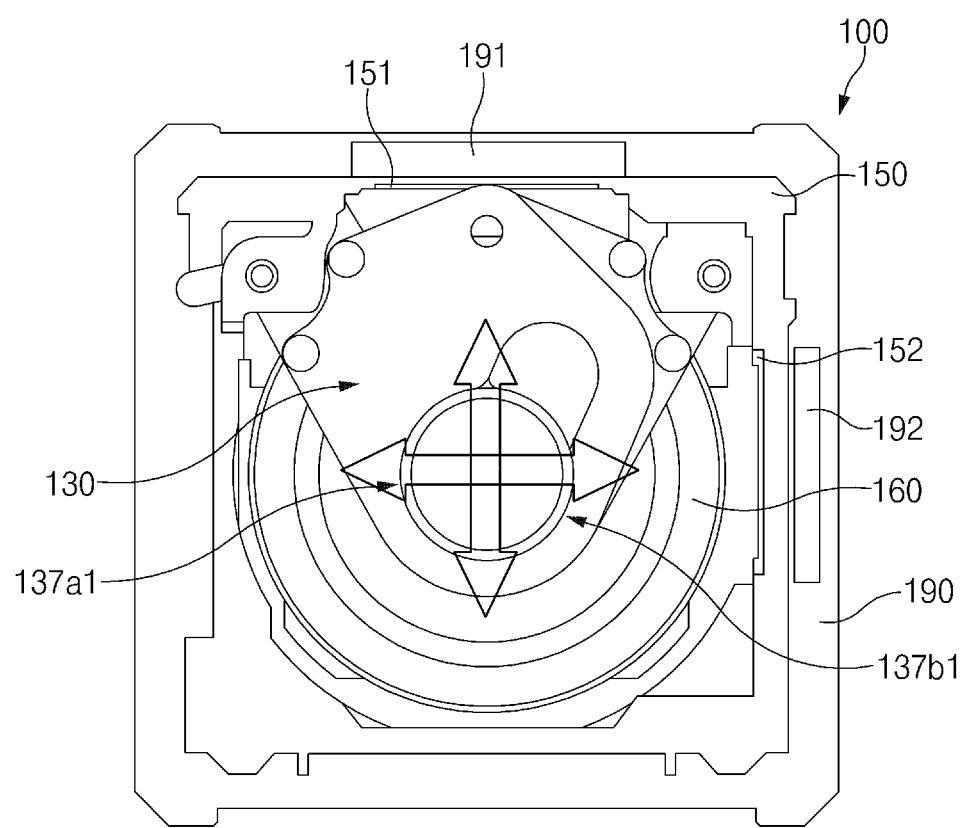
FIG. 11 is a top view illustrating a shakiness compensation operation of a camera module according to an embodiment of the present disclosure.

FIG. 11 is a top view illustrating a shakiness compensation operation of a camera module according to an embodiment of the present disclosure.

Referring to FIG. 11, the camera module 100 may include a first coil 191 configured to generate a motion in the X-axis direction, and a second coil 192 configured to generate a motion in the Y-axis direction. The first coil 191 and the second coil 192 may be disposed on two sides of the housing 190, and may be disposed on an inner wall of the housing 190, which may face an outer wall of the first movable carrier 150. The first magnet member 151 may be disposed in one side of the first movable carrier 150 to face the first coil 191. The second magnet member 151 may be disposed in another side of the first movable carrier 150 to face the second coil 192.

The variable aperture 130 may be disposed on the lens barrel 160. Although FIG. 11 shows that the variable aperture 130 is in a first adjustment state 801, the present disclosure is not limited thereto. The variable aperture 130 may be supported by one side of the lens barrel 160, and may have the same motion as the lens barrel 160 when the first movable carrier 150 moves in the X-axis direction and/or the Y-axis direction to compensate for shakiness.

Some components such as the lens barrel 160, the variable aperture 130, and the first movable carrier 150 of the camera module 100 may move in the +X-axis direction due to force generated by the interaction between the first coil 191 and the first magnet member 151. The +X-axis direction is shown FIG. 11 as the upwards direction. According to an embodiment, the first coil 191 and the first magnet member 151 may be supplied with electric power such that an attractive force is generated between them. In this case, the first movable carrier 150 including the first magnet member 151 may be moved toward the housing 190, and the lens barrel 160 may be moved in an upward direction. According to an embodiment, the lens barrel 160 may be moved in an upward direction by 0.2 mm. The movement distance of the lens barrel 160 may vary according to the size of the camera module 100.

Some components such as the lens barrel 160, the variable aperture 130, and the first movable carrier 150 of the camera module 100, may move in the −X-axis direction due to force generated by the interaction between the first coil 191 and the first magnet member 151. The −X-axis direction is shown FIG. 11 as the downwards direction. According to an embodiment, the first coil 191 and the first magnet member 151 may be supplied with electric power such that a repulsive force is generated between them. In this case, the first movable carrier 150 including the first magnet member 151 is moved away from to the housing 190, and the lens barrel 160 may be moved in a downward direction. According to an embodiment, the lens barrel 160 may be moved in a downward direction by 0.2 mm. The movement distance of the lens barrel 160 may vary according to the size of the camera module 100.

Some components such as the lens barrel 160, the variable aperture 130, and the first movable carrier 150 of the camera module 100 may move in the +Y-axis direction due to force generated by the interaction between the second coil 192 and the second magnet member 152. The +Y-axis direction is shown in FIG. 11 as the rightward direction. According to an embodiment, the second coil 192 may be supplied with electric power such that an attractive force is generated between the second coil 192 and the second magnet member 152. In this case, the first movable carrier 150 including the second magnet member 152 may be moved toward the housing 190, and the lens barrel 160 may be moved in the rightward direction. According to an embodiment, the lens barrel 160 may be moved in the rightward direction by 0.2 mm. The movement distance of the lens barrel 160 may vary according to the size of the camera module 100.

Some components such as the lens barrel 160, the variable aperture 130, and the first movable carrier 150 of the camera module 100 may move in the −Y-axis direction due to force generated by the interaction between the second coil 192 and the second magnet member 152. The −Y-axis direction is shown in FIG. 11 as a leftward direction. According to an embodiment, the first coil 191 may be supplied with electric power such that a repulsive force is generated between the first coil 192 and the first magnet member 151. In this case, the first movable carrier 150 including the first magnet member 151 moves away from the housing 190, and the lens barrel 160 may be moved in the leftward direction. According to an embodiment, the lens barrel 160 may be moved in the leftward direction by 0.2 mm. The movement distance of the lens barrel 160 may vary according to the size of the camera module 100.

The above-described camera module 100 may perform OIS (optical image stabilization) and maintain alignment between the lens barrel 160 and the lens hole 161a.

Figure 12:
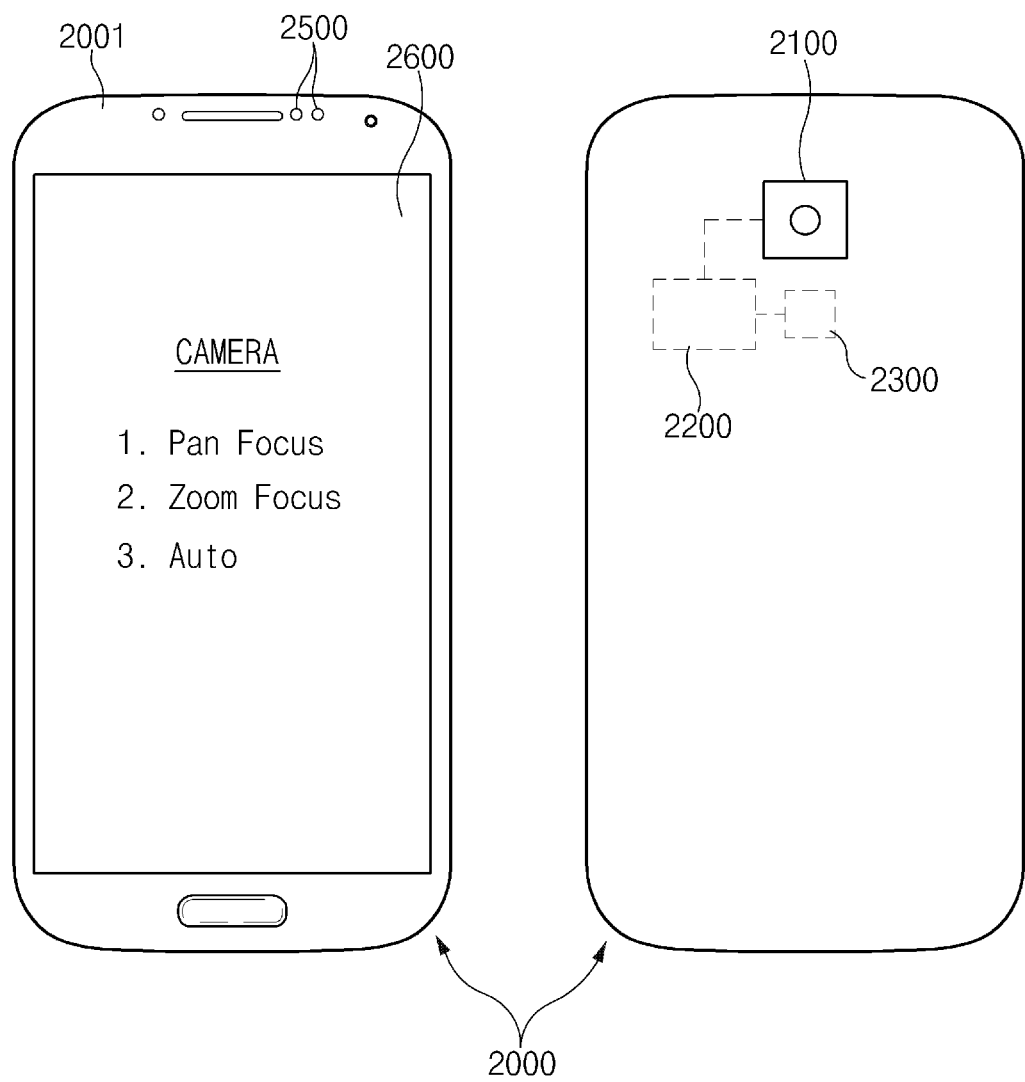
FIG. 12 is a top view illustrating an electronic device including a camera module according to an embodiment of the present disclosure.

FIG. 12 is a top view illustrating an electronic device including a camera module according to an embodiment of the present disclosure.

Referring to FIGS. 8A to 8D and 12, the electronic device 2000 according to an embodiment of the present disclosure may include a processor 2200, a memory 2300, a sensor 2500, a camera module 2100 (e.g., the camera module 100), and the display 2600. For example, the display 2600 may be disposed on a front surface of the electronic device 2000, and the camera module 2100 may be disposed on a rear surface of the electronic device 2000. In another embodiment, another camera module may be disposed on the front surface of the electronic device 2000.

The electronic device 2000 may include a printed circuit board, in which the processor 2200, the memory 2300, and the sensor 2500 are seated, and a case 2001 for housing the printed circuit board and the display 2600. A hole may be formed on one side of the case 2001 such that the camera module 2100 may be disposed in the hole. Accordingly, one surface (e.g., the surface on which a lens hole is disposed) of the camera module 2100 may be exposed through the hole formed on one side of the case 2001. A cover (e.g., a glass cover) may be disposed in the hole formed in the case 2001 to protect the camera module 2100.

According to an embodiment of the present disclosure, the processor 2200 may deliver a control signal related to driving of the camera module 2100 to the camera module 2100, and may output an image captured by the camera module 2100 through the display 2600 or store the image in the memory 2300. According to an embodiment, the processor 2200 may output a user interface (UI) related to selection of photographing functions of the camera module 2100 through the display 2600. For example, the processor 2200 may output a menu screen for selecting the pan-focusing function or the zoom-focus function selection item on the display 2600. The processor 2200 may deliver a first control signal corresponding to selection of the pan-focusing function or a second control signal corresponding to selection of the zoom-focus function to the camera module 2100.

The first control signal may relate to the first adjustment state 801, and the second control signal may relate to the fourth adjustment state 804. In one embodiment, the first and second control signals may be generated based on sensor information collected by the sensor 2500. For example, the processor 2200 may determine illumination intensity based on the illumination intensity information provided by the sensor 2500. When the illumination intensity is lower than a predetermined threshold, the processor 2200 may deliver the first control signal to the camera module 2100. But when the illumination intensity exceeds the threshold, the processor 2200 may deliver the second control signal to the camera module 2100.

The memory 2300 may store program(s) or data related to management of the electronic device 2000. The memory 2300 may store images (e.g., preview images, still images, or videos) captured by the camera module 2100. According to an embodiment, the memory 2300 may store application(s) related to management of the camera module 2100. Further, the memory 2300 may store instruction(s) to transmit the first control signal or the second control signal to the camera module 2100 in correspondence to the user input that is input from the input/output interface previously described. Further, the memory 2300 may store instruction(s) to transmit the first control signal or the second control signal to the camera module 2100 based on the sensor information collected by the sensor 2500.

The sensor 2500 may include at least one sensor related to management of the electronic device 2000. For example, the sensor 2500 may include an illumination sensor that may measure the intensity of illumination surrounding the electronic device 2000. When the camera module 2100 is activated, the sensor 2500 may collect sensor information, and may deliver the collected sensor information to the processor 2200. Although it has been exemplified in the illustrated description that information from the sensor 2500 is connected to the processor 2200, the present disclosure is not limited thereto. For example, the sensor 2500 may be directly connected to the camera module 2100. In this case, an image sensor IC included in the camera module 2100 may change management of the sensor 2500 and change the state of the variable aperture 130 depending on the information from the sensor 2500.

The display 2600 may include at least one screen related to management of the electronic device 2000. According to an embodiment, the display 2600 may provide icons or a menu related to activation or deactivation of the camera module 2100. The display 2600 may output a user interface that allows the user to select the first adjustment state 801 or the fourth adjustment state 804 of the variable aperture 130. Further, if the camera module 2100 is activated according to a request for activation of the camera module 2100, the display 2600 may output a text or an image corresponding to the adjustment state of the variable aperture 130.

In relation to management of an electronic device according to an embodiment of the present disclosure, the processor 2200 may activate the camera module. For example, the processor 2200 may provide icons or a menu related to activation of the camera module or may provide a button related to activation of the camera module. If an input signal corresponding to activation is received, the processor 2200 may activate the camera module 2100 by supplying the camera module 2100 (e.g., the camera module 100) with electric power. Further, the processor 2200 may automatically activate the camera module 2100 if a request for execution of a function (e.g., still image or video capture) is made.

The processor 2200 may identify a setting function. For example, the processor 2200 may identify whether an input signal related to changing the variable aperture 130 is generated. Further, the processor 2200 may identify the state of the variable aperture 130.

When execution of the pan-focusing function, the processor 2200 may adjust the state of the variable aperture 130 to the first adjustment state 801 (e.g., where the first lower hole 137*a*1 of the first wing 134*a* and the second lower hole 137*b*1 of the second wing 134*b* overlap each other).

When execution of the zoom-focusing function, the processor 2200 may adjust the state of the variable aperture 130 to the fourth adjustment state 804 (e.g., where the first upper hole 137*a*2 of the first wing 134*a* and the second upper hole 137*b*2 of the second wing 134*b* overlap each other).

According to various embodiments, if deactivation of the camera module 2100 is requested, the processor 2200 may deactivate the camera module 2100 after changing the state of the variable aperture 130 to a specific state. For example, when the pan-focusing function is mainly used, the processor 2200 may deactivate the camera module 2100 after changing the state of the variable aperture 130 to the first adjustment state 801. Conversely, when the zoom-focusing function is mainly used, the processor 2200 may deactivate the camera module 2100 after changing the state of the variable aperture 130 to the fourth adjustment state 804.

According to various embodiments, if deactivation of the camera module 2100 is requested, the processor 2200 may deactivate the camera module 2100 after changing the state of the variable aperture 130 according to the illumination intensity shortly before the request for deactivation. For example, when the illumination intensity shortly before the deactivation of the camera module 2100 is lower than a specified threshold, the processor 2200 may deactivate the camera module 2100 after changing the state of the variable aperture 130 to the first adjustment state 801. But when the illumination intensity shortly before the deactivation of the camera module 2100 exceeds the threshold, the processor 2200 may deactivate the camera module 2100 after changing the state of the variable aperture 130 to the fourth adjustment state 804.

According to various embodiments, when deactivation of the camera module 2100 is requested, the processor 2200 may restore the state of the variable aperture 130 to a default state. For example, if the default state of the aperture coil 172 and the third magnet member 188 is designed to be a state in which the first lower hole 138*a*1 and the second lower hole 137*b*1 overlap each other, the processor 2200 may deactivate the camera module 2100 after the variable aperture 130 is restored to the default state. Alternatively, the default state may be where the first upper hole 137*a*2 and the second upper hole 137*b*2 overlap each other.

According to various embodiments, the electronic device 2000 may further include an input/output interface. The input/output interface may include an audio device, and may output audio information corresponding to the current state of the variable aperture 130 of the camera module 2100. For example, if an input signal related to a request of activation of the camera module 2100 is generated, the audio device may output audio information corresponding to the current state of the camera module 2100. Further, if the state of the camera module 2100 is changed, the audio device may output audio information corresponding to the changed state.

According to various embodiments, a camera module (or camera device) may include a lens barrel including at least one lens and a lens hole; a variable aperture defining an aperture hole area arranged on the lens hole, where a size of the aperture hole area is adjustable via a physical force applied to a lever; a first movable carrier in which the lens barrel is seated, to which the variable aperture is fixed, and including at least one magnet member is configured to cooperate with at least one coil to move the first movable carrier; and an aperture driving module configured to adjust the size of the aperture hole area by supplying the physical force to the lever.

According to various embodiments, the at least one magnet member may include a first magnet member configured to cooperate with a first coil to move the first movable carrier in an X-axis direction; and a second magnet member configured to cooperate with a second coil to move the first movable carrier in an Y-axis direction.

According to various embodiments, the aperture driving module may include a support coupled to the lever; an aperture coil; and an aperture driving magnet member configured to cooperate with the aperture coil to move the support, which in turn moves the lever.

According to various embodiments, the support may include a central body on which the aperture driving magnet member is seated; a lever holder extending from one side of the central body; and a holding hole formed in the lever holder, in which the lever is inserted.

According to various embodiments, the holding hole may include a first region where the lever is located when the aperture hole area has a maximum size; a second region where the lever is located when the aperture hole area has a minimum size; and a first guard hole area adjacent to the first region and a second guard hole area adjacent to the second region, wherein the first guard hole area and the second guard hole area prevent contact between the lever and the lever holder when the first movable carrier is moving to compensate for shakiness of the camera device.

According to various embodiments, the camera module may further include a second movable carrier surrounding the first movable carrier and including another magnet member configured to cooperate with another coil to move the second movable carrier in a Z-axis direction, where the support is disposed on one side of the second movable carrier.

According to various embodiments, the camera module may further include a housing in which the second movable carrier is seated, where the aperture coil is disposed on one side of the housing; and where the aperture driving module further includes an aperture driving IC configured to control supply of electric power to the aperture coil.

According to various embodiments, the aperture driving IC may control the aperture driving module to move the lever by a first specified distance in a first direction in order to adjust the aperture hole area to a specified size, and after moving the lever by the first specified distance, control the aperture driving module to move the lever by a second specified distance in a second direction opposite the first direction.

According to various embodiments, the camera module may further include at least one of a shield can covering the lens barrel and at least a portion of the variable aperture; and a stopper disposed on the variable aperture and configured to prevent the variable aperture from deviating in a Z-axis direction.

According to various embodiments, the stopper may include a stopper substrate including a stopper hole that coincides with the aperture hole area; and an upper substrate including connection portions, where the connecting portions are coupled to the stopper substrate such that the stopper substrate is separated from the variable aperture by a specified interval.

According to various embodiments, an upper end of an uppermost lens of the lens barrel protrudes through the aperture hole area of the variable aperture.

According to various embodiments, an electronic device may include a case; a camera device, at least a portion of which is exposed through a hole formed in the case; and a processor electrically connected to the camera device, where the camera device includes: a lens barrel including at least one lens and a lens hole; a variable aperture defining an aperture hole area arranged on the lens hole, wherein a size of the aperture hole area is adjustable via a physical force applied to a lever; a first movable carrier in which the lens barrel is seated, to which the variable aperture is fixed, and including at least one magnet member is configured to cooperate with at least one coil to move the first movable carrier; and an aperture driving module configured to adjust the size of the aperture hole area by supplying the physical force to the lever.

According to various embodiments, the aperture driving module may include a support coupled to the lever; an aperture coil; and an aperture driving magnet member configured to cooperate with the aperture coil to move the support, which in turn moves the lever, where the support includes a central body on which the aperture driving magnet member is seated; a lever holder extending from one side of the central body; and a holding hole formed in the lever holder, in which the lever is inserted, and where the holding hole comprises: a first region where the lever is located when the aperture hole area has a maximum size; a second region where the lever is located when the aperture hole area has a minimum size; and a first guard hole area adjacent to the first region and a second guard hole area adjacent to the second region, wherein the first guard hole area and the second guard hole area prevent contact between the lever and the lever holder when the first movable carrier is moving to compensate for shakiness of the camera device.

According to various embodiments, the camera module may further include a second movable carrier surrounding the first movable carrier and including another magnet member configured to cooperate with another coil to move the second movable carrier in a Z-axis direction, and where the support is disposed on one side of the second movable carrier.

According to various embodiments, the camera module may further include a housing in which the second movable carrier is seated, where the aperture coil is disposed on one side of the housing; and where the aperture driving module further includes an aperture driving IC configured to control supply of electric power to the aperture coil.

According to various embodiments, the aperture driving IC and/or processor may control the aperture driving module to move the lever by a first specified distance in a first direction in order to adjust the aperture hole area to a specified size, and after moving the lever by the first specified distance, control the aperture driving module to move the lever by a second specified distance in a second direction opposite the first direction.

According to various embodiments, the camera module may further include at least one of a shield can covering the lens barrel and at least a portion of the variable aperture; and a stopper disposed on the variable aperture and configured to prevent the variable aperture from deviating in a Z-axis direction.

According to various embodiments, the processor may be configured to, if execution of a pan-focusing function is requested, transmit a first control signal to the variable aperture so that the aperture hole area has a maximum size; and if execution of an zoom-focusing function is requested, transmit a second control signal to the variable aperture so that the aperture hole area has a minimum size.

According to various embodiments, the electronic device may further include a sensor configured to sense illumination intensity information, where the processor is configured to: transmit a first control signal to the variable aperture so that the aperture hole area has a maximum size if the illumination intensity information is below a predetermined threshold; and transmit a second control signal to the variable aperture so that the aperture hole area has a minimum size if the illumination intensity information is equal to or greater than the predetermined threshold.

Figure 13:
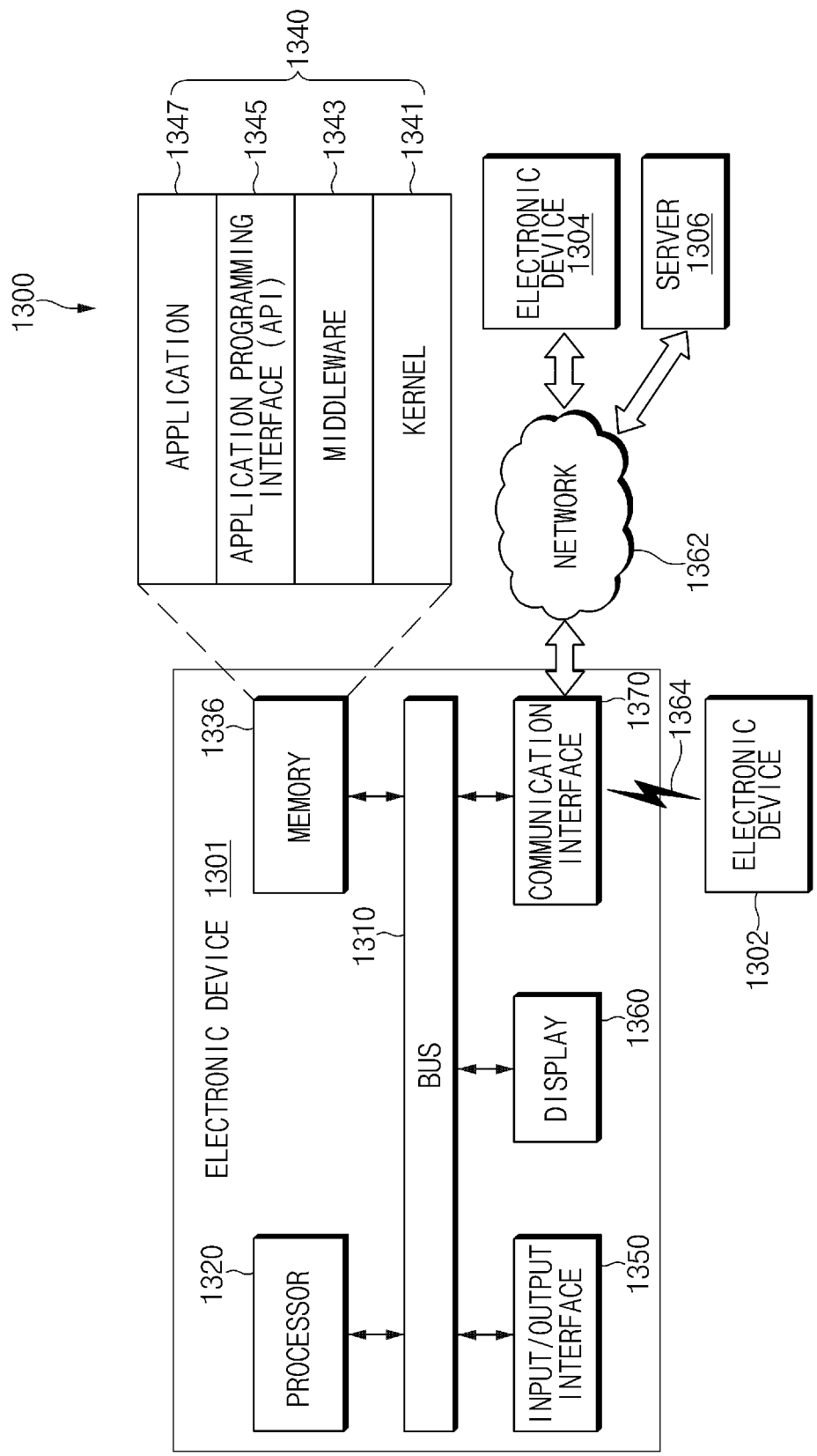
FIG. 13 is a view illustrating an example of an electronic device operating environment according to an embodiment of the present disclosure.

FIG. 13 is a block diagram illustrating a configuration of an electronic device in a network environment according to an embodiment.

Referring to FIG. 13, in various embodiments, an electronic device 1301 and a first external electronic device 1302, a second external electronic device 1304, or a server 1306 may connect with each other through a network 1362 or local-area communication 1364. The electronic device

1301 may include a bus 1310, a processor 1320, a memory 1336, an input and output interface 1350, a display 1360, and a communication interface 1370. In various embodiments, at least one of the components may be omitted from the electronic device 1301, or other components may be additionally included in the electronic device 1301.

The bus 1310 may be, for example, a circuit which connects the components 1320 to 1370 with each other and transmits a communication signal (e.g., a control message and/or data) between the components.

The processor 1320 may include one or more of a central processing unit (CPU), an application processor (AP), or a communication processor (CP). For example, the processor 1320 may perform calculation or data processing about control and/or communication of at least another of the components of the electronic device 1301.

The memory 1336 may include a volatile and/or non-volatile memory. The memory 1336 may store, for example, a command or data associated with at least another of the components of the electronic device 1301. According to an embodiment, the memory 1336 may store software and/or a program 1340. The program 1340 may include, for example, a kernel 1341, a middleware 1343, an application programming interface (API) 1345, and/or an least one application program 1347 (or "at least one application"), and the like. At least part of the kernel 1341, the middleware 1343, or the API 1345 may be referred to as an operating system (OS).

The kernel 1341 may control or manage, for example, system resources (e.g., the bus 1310, the processor 1320, or the memory 1336, and the like) used to execute an operation or function implemented in the other programs (e.g., the middleware 1343, the API 1345, or the application program 1347). Also, as the middleware 1343, the API 1345, or the application program 1347 accesses a separate component of the electronic device 1301, the kernel 1341 may provide an interface which may control or manage system resources.

The middleware 1343 may play a role as, for example, a go-between such that the API 1345 or the application program 1347 communicates with the kernel 1341 to communicate data.

Also, the middleware 1343 may process one or more work requests, received from the application program 1347, in order of priority. For example, the middleware 1343 may assign priority which may use system resources (the bus 1310, the processor 1320, or the memory 1336, and the like) of the electronic device 1301 to at least one of the at least one application program 1347. For example, the middleware 1343 may perform scheduling or load balancing for the one or more work requests by processing the one or more work requests in order of the priority assigned to the at least one of the at least one application program 1347.

The API 1345 may be, for example, an interface in which the application program 1347 controls a function provided from the kernel 1341 or the middleware 1343. For example, the API 1345 may include at least one interface or function (e.g., a command) for file control, window control, image processing, or text control, and the like.

The input and output interface 1350 may play a role as, for example, an interface which may transmit a command or data input from a user or another external device to another component (or other components) of the electronic device 1301. Also, input and output interface 1350 may output an instruction or data received from another component (or other components) of the electronic device 1301 to the user or the other external device.

The display 1360 may include, for example, a liquid crystal display (LCD), a light emitting diode (LED) display, an organic LED (OLED) display, a microelectromechanical systems (MEMS) display, or an electronic paper display. The display 1360 may display, for example, a variety of content (e.g., text, images, videos, icons, or symbols, and the like) to the user. The display 1360 may include a touch screen, and may receive, for example, touch, gesture, proximity, or a hovering input using an electronic pen or part of a body of the user.

The communication interface 1370 may establish communication between, for example, the electronic device 1301 and an external device (e.g., a first external electronic device 1302, a second external electronic device 1304, or a server 1306). For example, the communication interface 1370 may connect to a network 1362 through wireless communication or wired communication and may communicate with the external device (e.g., the second external electronic device 1304 or the server 1306).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1364. The local-area communication 1364 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1301 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1362 may include a telecommunications network, for example, at least one of a computer network (e.g., a local area network (LAN) or a wide area network (WAN)), the Internet, or a telephone network.

Each of the first and second external electronic devices 1302 and 1304 may be the same as or different device from the electronic device 1301. According to an embodiment, the server 1306 may include a group of one or more servers. According to various embodiments, all or some of operations executed in the electronic device 1301 may be executed in another electronic device or a plurality of electronic devices (e.g., the first external electronic device 1302, the second external electronic device 1304, or the server 1306). According to an embodiment, if the electronic device 1301 should perform any function or service automatically or according to a request, it may request another device (e.g., the first external electronic device 1302, the second external electronic device 1304, or the server 106) to perform at least part of the function or service, rather than executing the function or service for itself or in addition to the function or service. The other electronic device (e.g., the first external electronic device 1302, the second external electronic device 1304, or the server 1306) may execute the requested function or the added function and may transmit the executed result to the electronic device 1301. The electronic device 1301 may process the received result without change or additionally and may provide the requested function or service. For this purpose, for example, cloud computing technologies, distributed computing technologies, or client-server computing technologies may be used.

Figure 14:
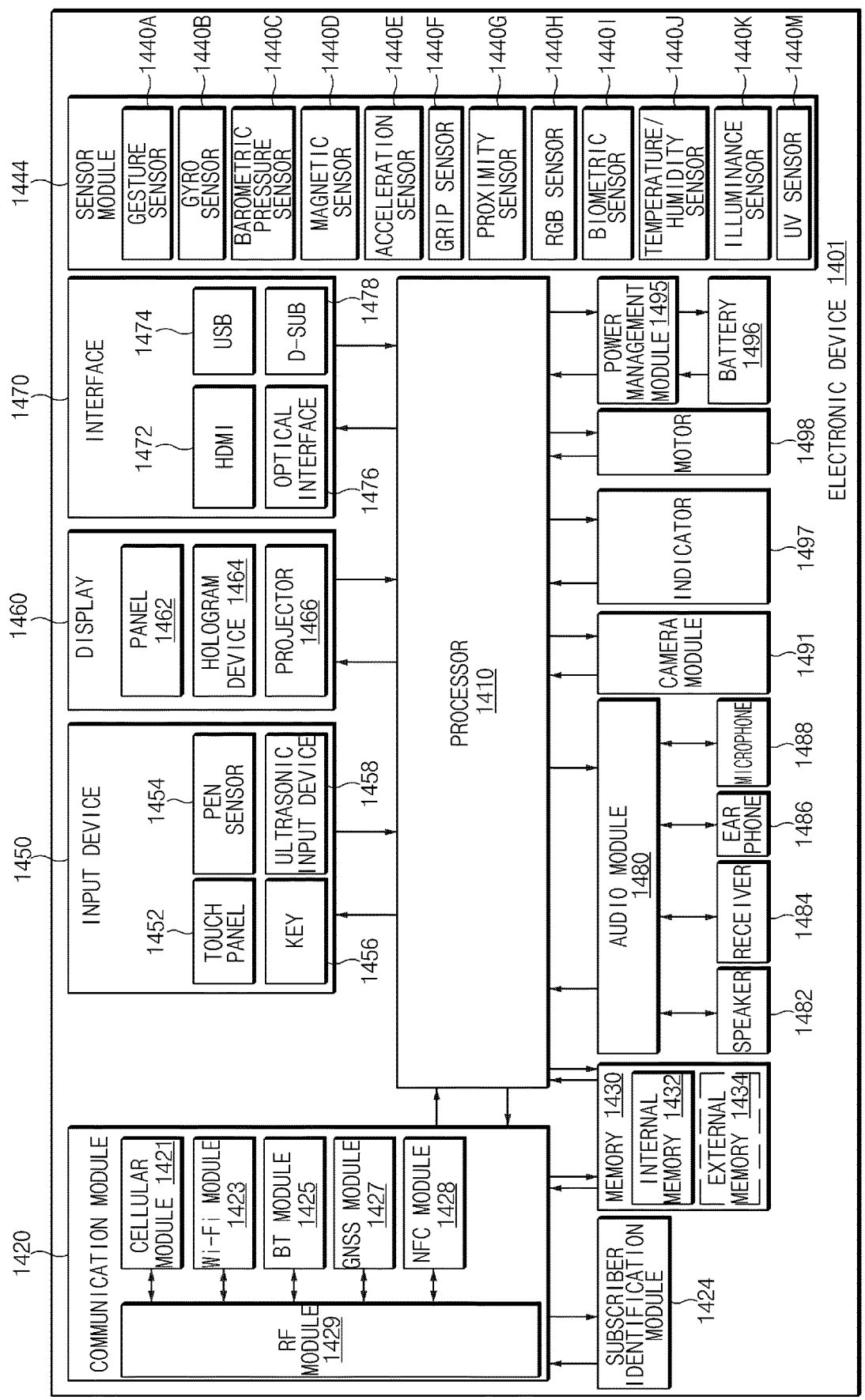
FIG. 14 is a block diagram of an electronic device according to various embodiments.

FIG. 14 is a block diagram illustrating a configuration of an electronic device according to various embodiments.

Referring to FIG. 14, the electronic device 1401 may include, for example, all or part of an electronic device 1301 shown in FIG. 13. The electronic device 1401 may include one or more processors 1410 (e.g., application processors (APs)), a communication module 1420, a subscriber identification module (SIM) 1424, a memory 1430, a security module 1436, a sensor module 1444, an input device 1450, a display 1460, an interface 1470, an audio module 1480, a camera module 1491, a power management module 1495, a battery 1496, an indicator 1497, and a motor 1498.

The processor 1410 may drive, for example, an operating system (OS) or an application program to control a plurality of hardware or software components connected thereto and may process and compute a variety of data. The processor 1410 may be implemented with, for example, a system on chip (SoC). According to an embodiment, the processor 1410 may include a graphic processing unit (GPU) (not shown) and/or an image signal processor (not shown). The processor 1410 may include at least some (e.g., a cellular module 1421) of the components shown in FIG. 14. The processor 1410 may load a command or data received from at least one of other components (e.g., a non-volatile memory) into a volatile memory to process the data and may store various data in a non-volatile memory.

The communication module 1420 may have the same or similar configuration to a communication interface 1370 of FIG. 13. The communication module 1420 may include, for example, the cellular module 1421, a wireless-fidelity (Wi-Fi) module 1422, a Bluetooth (BT) module 1425, a global navigation satellite system (GNSS) module 1427 (e.g., a GPS module, a Glonass module, a Beidou module, or a Galileo module), a near field communication (NFC) module 1428, an MST module, a secure module and a radio frequency (RF) module 1429.

The cellular module 1421 may provide, for example, a voice call service, a video call service, a text message service, or an Internet service, and the like through a communication network. According to an embodiment, the cellular module 1421 may identify and authenticate the electronic device 1401 in a communication network using the SIM 1424 (e.g., a SIM card). According to an embodiment, the cellular module 1421 may perform at least part of functions which may be provided by the processor 1410. According to an embodiment, the cellular module 1421 may include a communication processor (CP).

The Wi-Fi module 1423, the BT module 1425, the GNSS module 1427, the NFC module 1428, or the MST module may include, for example, a processor for processing data transmitted and received through the corresponding module. According to various embodiments, at least some (e.g., two or more) of the cellular module 1421, the Wi-Fi module 1423, the BT module 1425, the GNSS module 1427, the NFC module 1428, or the MST module may be included in one integrated chip (IC) or one IC package.

The RF module 1429 may transmit and receive, for example, a communication signal (e.g., an RF signal). Though not shown, the RF module 1429 may include, for example, a transceiver, a power amplifier module (PAM), a frequency filter, or a low noise amplifier (LNA), or an antenna, and the like. According to another embodiment, at least one of the cellular module 1421, the Wi-Fi module 1423, the BT module 1425, the GNSS module 1427, the NFC module 1428, or the MST module may transmit and receive an RF signal through a separate RF module.

The SIM 1424 may include, for example, a card which includes a SIM and/or an embedded SIM. The SIM 1424 may include unique identification information (e.g., an integrated circuit card identifier (ICCID)) or subscriber information (e.g., an international mobile subscriber identity (IMSI)).

The memory 1430 (e.g., a memory 1336 of FIG. 13) may include, for example, an embedded memory 1432 or an external memory 1434. The embedded memory 1432 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1434 may include a flash drive, for example, a compact flash (CF), a secure digital (SD), a micro-SD, a mini-SD, an extreme digital (xD), a multimedia car (MMC), or a memory stick, and the like. The external memory 1434 may operatively and/or physically connect with the electronic device 1401 through various interfaces.

The secure module may be a module which has a relatively higher secure level than the memory 1430 and may be a circuit which stores secure data and guarantees a protected execution environment. The secure module may be implemented with a separate circuit and may include a separate processor. The secure module may include, for example, an embedded secure element (eSE) which is present in a removable smart chip or a removable SD card or is embedded in a fixed chip of the electronic device 1401. Also, the secure module may be driven by an OS different from the OS of the electronic device 1401. For example, the secure module may operate based on a java card open platform (JCOP) OS.

The sensor module 1444 may measure, for example, a physical quantity or may detect an operation state of the electronic device 1401, and may convert the measured or detected information to an electric signal. The sensor module 1444 may include at least one of, for example, a gesture sensor 1440A, a gyro sensor 1440B, a barometer sensor 1440C, a magnetic sensor 1440D, an acceleration sensor 1440E, a grip sensor 1440F, a proximity sensor 1440G, a color sensor 1440H (e.g., red, green, blue (RGB) sensor), a biometric sensor 1440I, a temperature/humidity sensor 1440J, an illumination sensor 1440K, or an ultraviolet (UV) sensor 1440M. Additionally or alternatively, the sensor module 1444 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1444 may further include a control circuit for controlling at least one or more sensors included therein. According to various embodiments, the electronic device 1401 may further include a processor configured to control the sensor module 1444, as part of the processor 1410 or to be independent of the processor 1410. While the processor 1410 is in a sleep state, the electronic device 1401 may control the sensor module 1444.

The input device 1450 may include, for example, a touch panel 1452, a (digital) pen sensor 1454, a key 1456, or an ultrasonic input device 1458. The touch panel 1452 may use at least one of, for example, a capacitive type, a resistive type, an infrared type, or an ultrasonic type. Also, the touch panel 1452 may further include a control circuit. The touch panel 1452 may further include a tactile layer and may provide a tactile reaction to a user.

The (digital) pen sensor 1454 may be, for example, part of the touch panel 1452 or may include a separate sheet for recognition. The key 1456 may include, for example, a physical button, an optical key, or a keypad. The ultrasonic input device 1458 may allow the electronic device 1401 to detect a sound wave using a microphone (e.g., a microphone 1488) and to verify data through an input tool generating an ultrasonic signal.

The display 1460 (e.g., a display 1360 of FIG. 13) may include a panel 1462, a hologram device 1464, or a projector 1466. The panel 1462 may include the same or similar configuration to the display 1360. The panel 1462 may be implemented to be, for example, flexible, transparent, or wearable. The panel 1462 and the touch panel 1452 may be integrated into one module. The hologram device 1464 may show a stereoscopic image in a space using interference of light. The projector 1466 may project light onto a screen to display an image. The screen may be positioned, for example, inside or outside the electronic device 1401. According to an embodiment, the display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature 1478. The interface 1470 may be included in, for example, a communication interface 1370 shown in FIG. 13. Additionally or alternatively, the interface 1470 may include, for example, a mobile high definition link (MHL) interface, an SD card/multimedia card (MMC) interface, or an infrared data association (IrDA) standard interface.

The audio module 1480 may convert a sound and an electric signal in dual directions. At least part of components of the audio module 1480 may be included in, for example, an input and output interface 1350 (or a user interface) shown in FIG. 13. The audio module 1480 may process sound information input or output through, for example, a speaker 1482, a receiver 1484, an earphone 1486, or the microphone 1488, and the like.

The camera module 1491 may be a device which captures a still image and a moving image. According to an embodiment, the camera module 1491 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1495 may manage, for example, power of the electronic device 1401. According to an embodiment, though not shown, the power management module 1495 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1496 and voltage, current, or temperature thereof while the battery 1496 is charged. The battery 1496 may include, for example, a rechargeable battery or a solar battery.

The indicator 1497 may display a specific state of the electronic device 1401 or part (e.g., the processor 1410) thereof, for example, a booting state, a message state, or a charging state, and the like. The motor 1498 may convert an electric signal into mechanical vibration and may generate vibration or a haptic effect, and the like. Though not shown, the electronic device 1401 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 15:
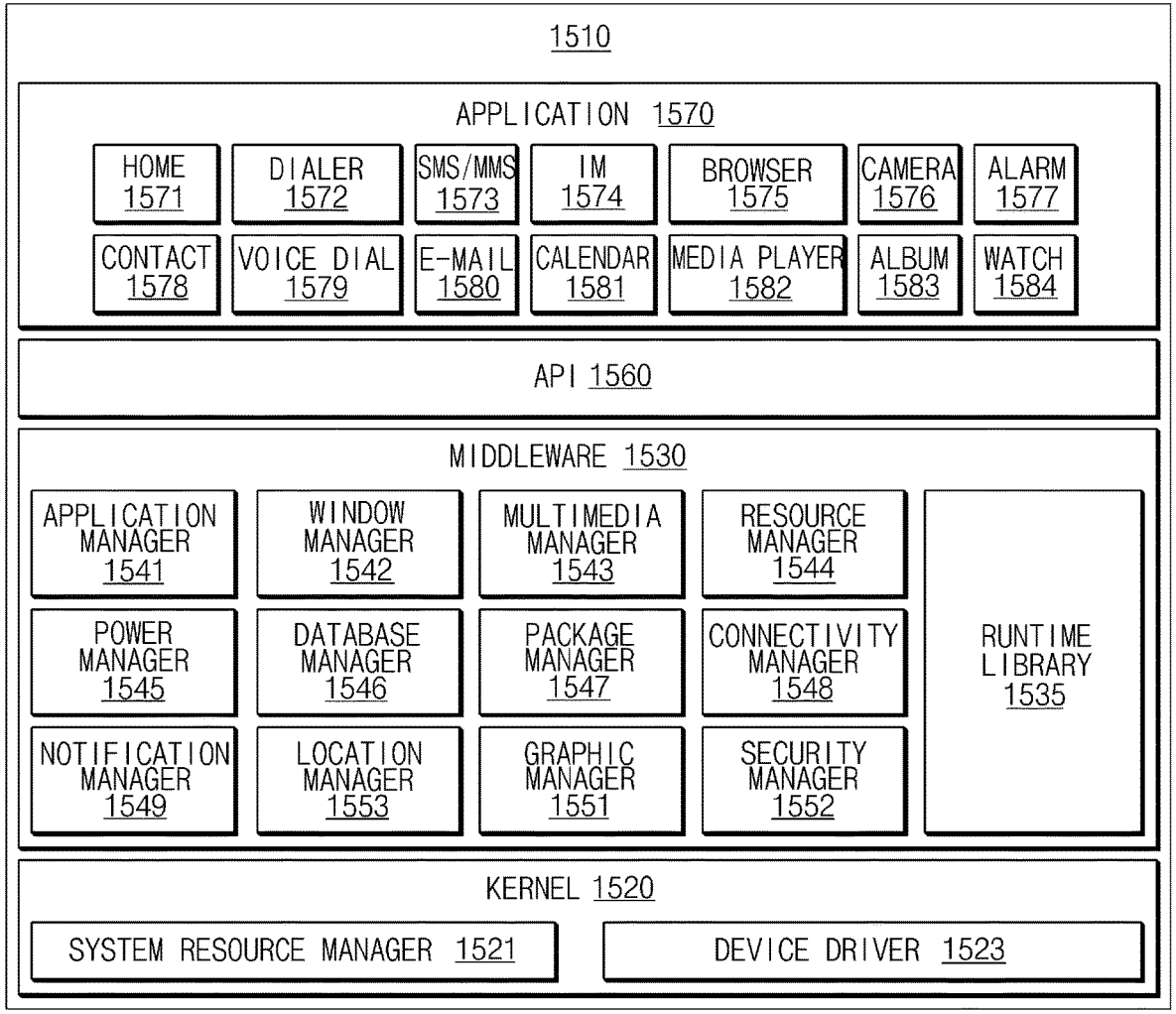
FIG. 15 is a block diagram of a program module according to various embodiments.

FIG. 15 is a block diagram illustrating a configuration of a program module according to various embodiments.

According to an embodiment, the program module 1510 (e.g., a program 1340 of FIG. 13) may include an operating system (OS) for controlling resources associated with an electronic device (e.g., an electronic device 1301 of FIG. 13) and/or various applications (e.g., an application program 1347 of FIG. 13) which are executed on the OS. The OS may be, for example, Android, iOS, Windows, Symbian, Tizen, or Bada, and the like.

The program module 1510 may include a kernel 1520, a middleware 1530, an application programming interface (API) 1560, and/or an application 1570. At least part of the program module 1510 may be preloaded on the electronic device, or may be downloaded from an external electronic device (e.g., a first external electronic device 1302, a second external electronic device 1304, or a server 1306, and the like of FIG. 13).

The kernel 1520 (e.g., a kernel 1341 of FIG. 13) may include, for example, a system resource manager 1521 and/or a device driver 1523. The system resource manager 1521 may control, assign, or collect, and the like system resources. According to an embodiment, the system resource manager 1521 may include a process management unit, a memory management unit, or a file system management unit, and the like. The device driver 1523 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1530 (e.g., a middleware 1343 of FIG. 13) may provide, for example, functions the application 1570 needs in common, and may provide various functions to the application 1570 through the API 1560 such that the application 1570 efficiently uses limited system resources in the electronic device. According to an embodiment, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1553, a graphic manager 1551, a security manager 1552, or a payment manager 1554.

The runtime library 1535 may include, for example, a library module used by a compiler to add a new function through a programming language while the application 1570 is executed. The runtime library 1535 may perform a function about input and output management, memory management, or an arithmetic function.

The application manager 1541 may manage, for example, a life cycle of at least one of the application 1570. The window manager 1542 may manage graphic user interface (GUI) resources used on a screen of the electronic device. The multimedia manager 1543 may determine a format utilized for reproducing various media files and may encode or decode a media file using a codec corresponding to the corresponding format. The resource manager 1544 may manage source codes of at least one of the application 1570, and may manage resources of a memory or a storage space, and the like.

The power manager 1545 may act together with, for example, a basic input/output system (BIOS) and the like, may manage a battery or a power source, and may provide power information utilized for an operation of the electronic device. The database manager 1546 may generate, search, or change a database to be used in at least one of the application 1570. The package manager 1547 may manage installation or update of an application distributed by a type of a package file.

The connectivity manager 1548 may manage, for example, wireless connection such as Wi-Fi connection or BT connection, and the like. The notification manager 1549 may display or notify events, such as an arrival message, an appointment, and proximity notification, by a method which is not disturbed to the user. The location manager 1553 may manage location information of the electronic device. The graphic manager 1551 may manage a graphic effect to be provided to the user or a user interface (UI) related to the graphic effect. The security manager 1552 may provide all security functions utilized for system security or user authentication, and the like. According to an embodiment, when the electronic device (e.g., an electronic device 1301 of FIG. 13) has a phone function, the middleware 1530 may further include a telephony manager (not shown) for managing a voice or video communication function of the electronic device.

The middleware 1530 may include a middleware module which configures combinations of various functions of the above-described components. The middleware 1530 may provide a module which specializes according to kinds of OSs to provide a differentiated function. Also, the middleware 1530 may dynamically delete some of old components or may add new components.

The API 1560 (e.g., an API 1345 of FIG. 13) may be, for example, a set of API programming functions, and may be provided with different components according to OSs. For example, in case of Android or iOS, one API set may be provided according to platforms. In case of Tizen, two or more API sets may be provided according to platforms.

The application 1570 (e.g., an application program 1347 of FIG. 13) may include one or more of, for example, a home application 1571, a dialer application 1572, a short message service/multimedia message service (SMS/MMS) application 1573, an instant message (IM) application 1574, a browser application 1575, a camera application 1576, an alarm application 1577, a contact application 1578, a voice dial application 1579, an e-mail application 1580, a calendar application 1581, a media player application 1582, an album application 1583, a clock application 1584, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1570 may include an application (hereinafter, for better understanding and ease of description, referred to as "information exchange application") for exchanging information between the electronic device (e.g., the electronic device 1301 of FIG. 13) and an external electronic device (e.g., the first external electronic device 1302 or the second external electronic device 1304). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1302 or the second external electronic device 1304). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1302 or the second external electronic device 1304) which communicates with the electronic device, an application which operates in the external electronic device, or a service (e.g., a call service or a message service) provided from the external electronic device.

According to an embodiment, the application 1570 may include an application (e.g., the health card application of a mobile medical device) which is preset according to attributes of the external electronic device (e.g., the first external electronic device 1302 or the second external electronic device 1304). According to an embodiment, the application 1570 may include an application received from the external electronic device (e.g., the server 1306, the first external electronic device 1302, or the second external electronic device 1304). According to an embodiment, the application 1570 may include a preloaded application or a third party application which may be downloaded from a server. Names of the components of the program module 1510 according to various embodiments of the present disclosure may differ according to kinds of OSs.

According to various embodiments, at least part of the program module 1510 may be implemented with software, firmware, hardware, or at least two or more combinations thereof. At least part of the program module 1510 may be implemented (e.g., executed) by, for example, a processor (e.g., a processor 1320 of FIG. 13). At least part of the program module 1510 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit," "logic," "logical block," "component," or "circuit," and the like. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The processor described herein may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

What is claimed is:

1. A portable communication device comprising:
    a processor; and
    a camera assembly, wherein the camera assembly includes:
        a lens barrel including at least one lens and a lens hole;
        a first carrier to receive the lens barrel;
        a variable aperture including at least one first magnet and an aperture hole, which are disposed in at least one side of the first carrier;
        a second carrier to receive the first carrier;
        a support disposed at one side surface of the second carrier; and
        a second magnet fixed to the support,
    wherein the support is connected with the variable aperture such that a size of the aperture hole is adjusted corresponding to movement of the support;
    wherein the at least one first magnet is movable in a direction perpendicular to an optical axis of the lens barrel in a state that the at least one first magnet is received in the second carrier, in association with an image stabilization function of the camera assembly; and wherein the second magnet is movable together with the support along a portion of the one side, in association with a function of adjusting the size of the aperture hole.

2. The portable communication device of claim 1, further comprising:
at least one first coil corresponding to the at least one first magnet; and
a second coil corresponding to the second magnet.

3. The portable communication device of claim 2, wherein the first carrier moves together with the lens barrel in the direction perpendicular to the optical axis depending on an interaction between the at least one first magnet and the first coil.

4. The portable communication device of claim 2, further comprising:
a housing to receive the second carrier,
wherein the at least one first coil is formed at least one of a first side surface or a second side surface of the housing; and
wherein the second coil is formed on a third side surface of the housing.

5. The portable communication device of claim 4, further comprising:
at least one third magnet fixed to the second carrier,
wherein the at least one third magnet is movable in a direction parallel to the optical axis, in association with a function of adjusting a focus of the camera assembly.

6. The portable communication device of claim 5, further comprising:
at least one third coil corresponding to the at least one third magnet,
wherein the at least one third magnet moves together with the second carrier in the direction perpendicular to the optical axis depending on an interaction with the at least one third coil.

7. The portable communication device of claim 6, wherein the at least one third coil is formed on a fourth side surface of the housing.

8. A portable communication device comprising:
a processor; and
a camera assembly, wherein the camera assembly includes:
a lens barrel including at least one lens and a lens hole;
a first carrier to receive the lens barrel;
a variable aperture fixed to the first carrier, aligned with the lens hole, and including an aperture hole;
a second carrier to receive the first carrier;
a first magnet attached to a first side surface of the second carrier;
a support disposed on a second side surface of the second carrier; and
a second magnet fixed to the support,
wherein the support is connected with the variable aperture such that a size of the aperture hole is adjusted corresponding to movement of the support;
wherein the first magnet is movable in a direction parallel to an optical axis of the lens barrel in association with a function of adjusting a focus of the camera assembly; and
wherein the second magnet is movable together with the support along a portion of the second side surface, in association with a function of adjusting a size of the aperture hole.

9. The portable communication device of claim 8, further comprising:
at least one first coil corresponding to the at least one first magnet; and
a second coil corresponding to the second magnet.

10. The portable communication device of claim 9, wherein the first carrier moves together with the lens barrel in the direction perpendicular to the optical axis depending on an interaction between the at least one first magnet and the first coil.

11. The portable communication device of claim 9, further comprising:
a housing to receive the second carrier,
wherein the at least one first coil is formed at least one of a first side surface or a second side surface of the housing; and
wherein the second coil is formed on a third side surface of the housing.

12. The portable communication device of claim 11, further comprising:
at least one third magnet fixed to the second carrier,
wherein the at least one third magnet is movable in a direction parallel to the optical axis, in association with a function of adjusting a focus of the camera assembly.

13. The portable communication device of claim 12, further comprising:
at least one third coil corresponding to the at least one third magnet; and
wherein the at least one third magnet moves together with the second carrier in the direction perpendicular to the optical axis depending on an interaction with the at least one third coil.

14. The portable communication device of claim 13, wherein the at least one third coil is formed on a fourth side surface of the housing.

* * * * *